US012039468B2

(12) United States Patent
Hirose et al.

(10) Patent No.: US 12,039,468 B2
(45) Date of Patent: Jul. 16, 2024

(54) VEHICLE MANAGEMENT METHOD AND VEHICLE MANAGEMENT APPARATUS

(71) Applicants: Nissan Motor Co., Ltd., Kanagawa (JP); RENAULT S.A.S., Boulogne-Billancourt (FR)

(72) Inventors: Satoru Hirose, Kanagawa (JP); Hiroya Fujimoto, Kanagawa (JP)

(73) Assignees: Nissan Motor Co., Ltd., Kanagawa (JP); RENAULT S.A.S., Boulogne-Billancourt (FR)

(*) Notice: Subject to any disclaimer, the term of this patent is extended or adjusted under 35 U.S.C. 154(b) by 512 days.

(21) Appl. No.: 16/964,332

(22) PCT Filed: Dec. 26, 2018

(86) PCT No.: PCT/IB2018/001585
§ 371 (c)(1),
(2) Date: Jul. 23, 2020

(87) PCT Pub. No.: WO2019/145747
PCT Pub. Date: Aug. 1, 2019

(65) Prior Publication Data
US 2021/0042670 A1 Feb. 11, 2021

(30) Foreign Application Priority Data
Jan. 25, 2018 (JP) ................. 2018-010483

(51) Int. Cl.
*G06Q 10/02* (2012.01)
*G01C 21/34* (2006.01)
(Continued)

(52) U.S. Cl.
CPC ......... *G06Q 10/02* (2013.01); *G01C 21/3438* (2013.01); *G06Q 10/06312* (2013.01);
(Continued)

(58) Field of Classification Search
CPC .. G06Q 10/02; G06Q 10/06312; G06Q 50/30; G06Q 50/40; G06Q 50/43; G06Q 50/47
See application file for complete search history.

(56) References Cited

U.S. PATENT DOCUMENTS

2016/0027306 A1* 1/2016 Lambert ................ G08G 1/202
701/117
2017/0075358 A1 3/2017 Zhang
(Continued)

FOREIGN PATENT DOCUMENTS

CN 105094767 A 11/2015
JP 2003044702 A 2/2003
(Continued)

OTHER PUBLICATIONS

Mitrović-Minić, Snežana, Laporte, Gilbert, "Waiting strategies for the dynamic pickup and delivery problem with time windows", 2004, Transportation Research Part B: Methodological, vol. 38, Issue 7, pp. 635-655 (Year: 2004).*
(Continued)

*Primary Examiner* — Jeff Zimmerman
*Assistant Examiner* — Wayne S. Murray
(74) *Attorney, Agent, or Firm* — Osha Bergman Watanabe & Burton LLP

(57) ABSTRACT

A vehicle management method is provided for setting a travel plan for a vehicle (Vn) using a server (10) configured to manage vehicle requests from a plurality of users. This method includes specifying an available vehicle from among a plurality of the vehicles as an in-use vehicle on the basis of the vehicle requests from the users who request use of the vehicle (Vn), setting the travel plan including a travel route of the in-use vehicle by way of a boarding location for each of the users on the basis of the vehicle requests from the users, and in a case in which a user of the users is absent at the boarding location when the in-use vehicle arrives at the
(Continued)

boarding location, setting a waiting time at the boarding location on the basis of the travel plan.

12 Claims, 14 Drawing Sheets

(51) Int. Cl.
  *G06Q 10/0631* (2023.01)
  *G06Q 50/40* (2024.01)
  *H04W 4/02* (2018.01)
(52) U.S. Cl.
  CPC ............ *G06Q 50/40* (2024.01); *H04W 4/023* (2013.01); *H04W 4/027* (2013.01)

(56) References Cited

U.S. PATENT DOCUMENTS

| | | |
|---|---|---|
| 2017/0098176 A1 | 4/2017 | Hirose et al. |
| 2017/0169366 A1* | 6/2017 | Klein ................... G06Q 10/025 |
| 2018/0211186 A1* | 7/2018 | Rakah ................. G01C 21/3492 |
| 2019/0137290 A1* | 5/2019 | Levy .................... B60Q 1/5035 |
| 2019/0354112 A1 | 11/2019 | Zhang |
| 2020/0013020 A1* | 1/2020 | Yang ................ G06Q 10/08355 |
| 2020/0334987 A1* | 10/2020 | Shoval ............... G01C 21/3415 |

FOREIGN PATENT DOCUMENTS

| | | |
|---|---|---|
| JP | 2003256990 A | 9/2003 |
| JP | 2017-010189 A | 1/2017 |
| WO | 2015-141291 A1 | 9/2015 |

OTHER PUBLICATIONS

International Search Report issued in International Application No. PCT/IB2018/001585, mailed May 21, 2019 (5 pages).

* cited by examiner

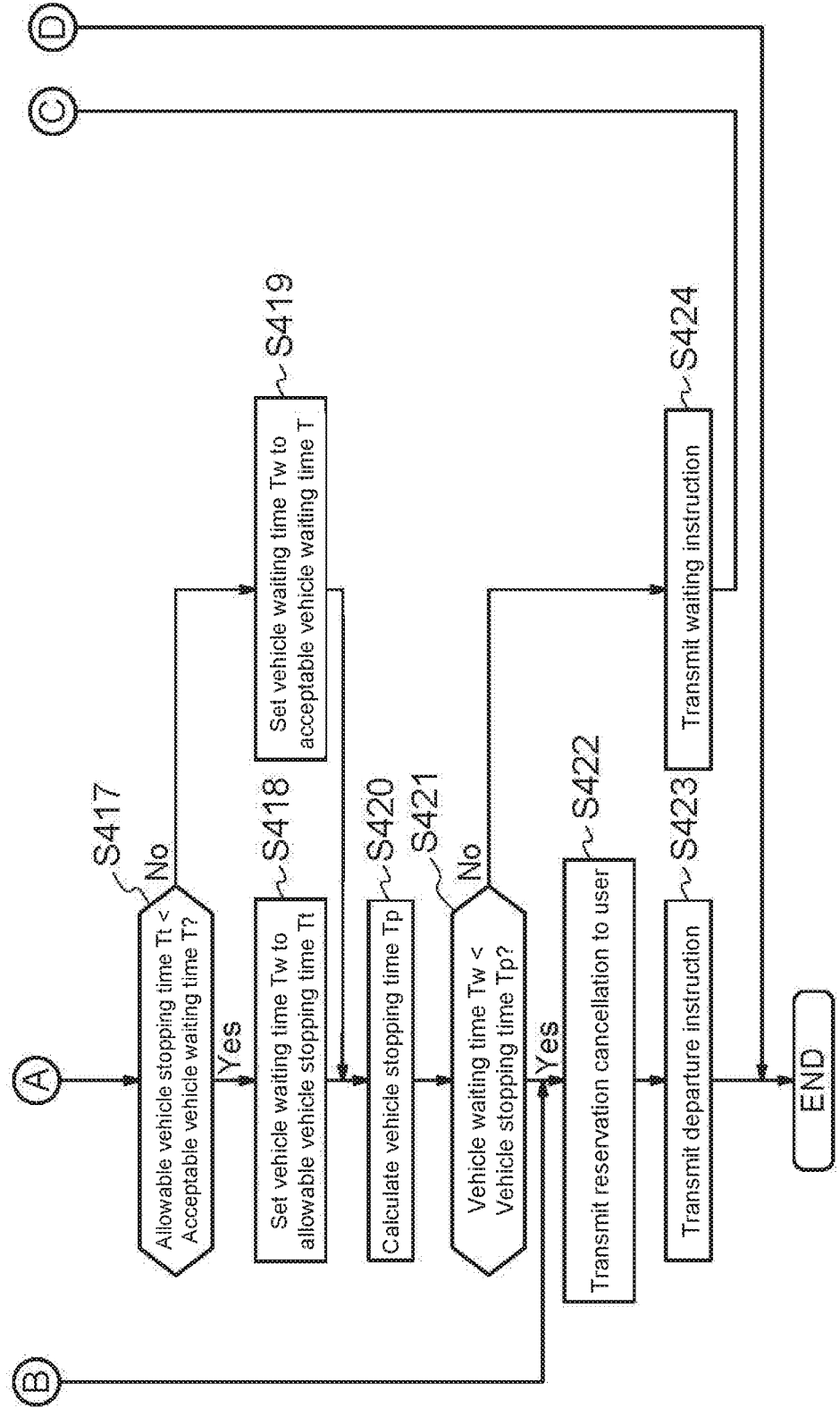

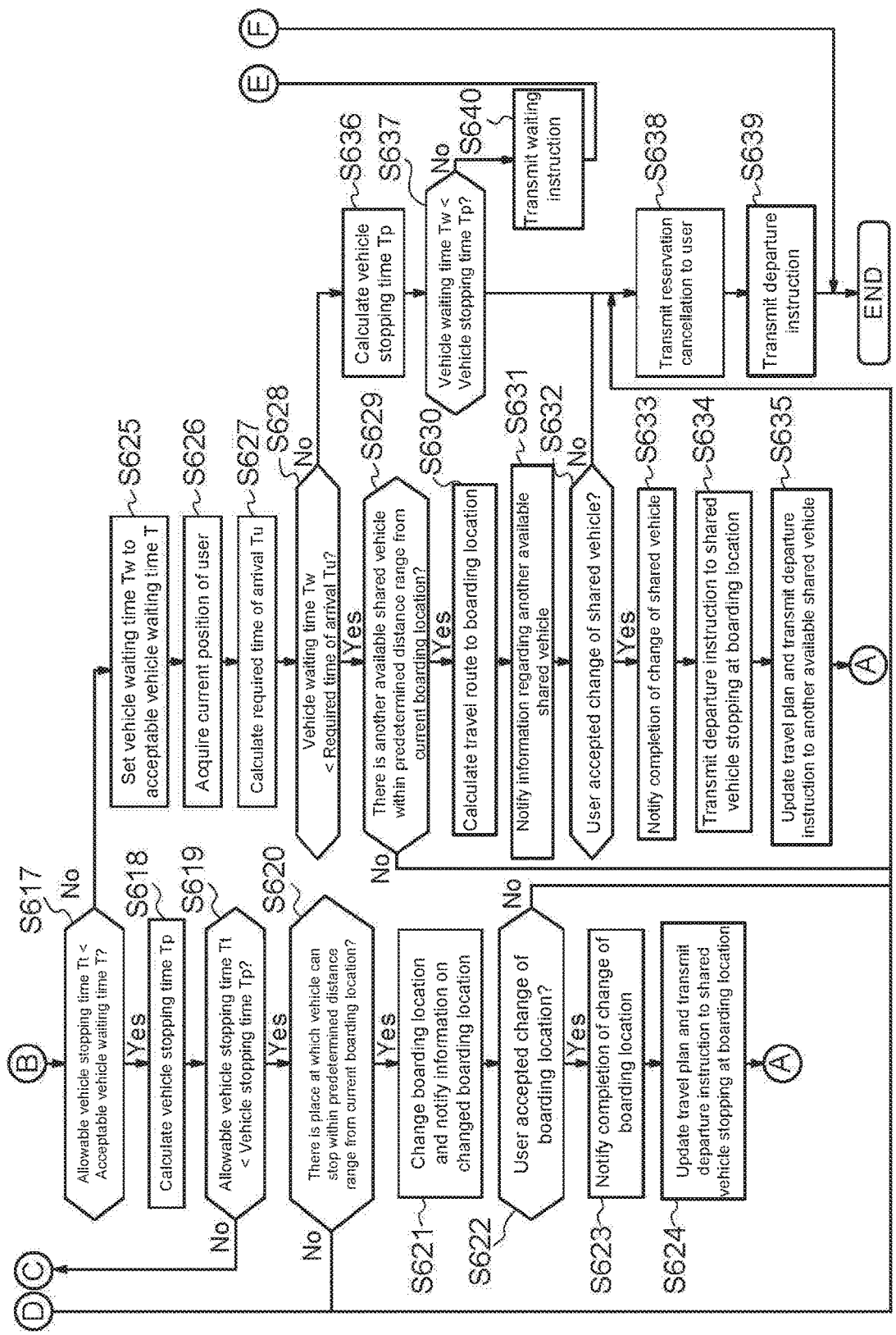

VEHICLE MANAGEMENT METHOD AND VEHICLE MANAGEMENT APPARATUS

TECHNICAL FIELD

The present invention relates to a vehicle management method and a vehicle management apparatus.

The present application claims priority based on Japanese Patent Application No. 2018-10483 filed on Jan. 25, 2018. For those designated countries which permit the incorporation by reference, the content described and/or illustrated in the above application is incorporated by reference in the present application as part of the description and/or drawings of the present application.

BACKGROUND ART

A ride-sharing mediation system is known which is configured to introduce other persons who share a ride on a taxicab via a communication network (Patent Document 1: JP2003-44702A). This ride-sharing mediation system operates to store and manage boarding information for each user. The boarding information includes at least a boarding location and a destination. When receiving an application for ride-sharing, the system refers to a boarding information storage means to select a candidate person who can share a ride in a similar direction. The system calculates information regarding a deviation of an estimated travel route when the present ride-sharing applicant and the candidate person share a ride and information regarding the fee paid for by each parson. The system guides the calculated information to the ride-sharing applicant and the candidate person. When obtaining agreement between the ride-sharing applicant and the candidate person, the system makes a determination that the ride-sharing is established. Then, when making the determination that the ride-sharing is established, the system transmits information including a meeting place to the users.

PRIOR ART DOCUMENT

Patent Document

[Patent Document 1] JP2003-44702A

SUMMARY OF INVENTION

Problems to be Solved by Invention

In the above prior art, however, a scene in which a user is absent at the boarding location is not assumed, and it is difficult to appropriately respond when a user is absent at the boarding location for some reason.

A problem to be solved by the present invention is to provide a vehicle management method and a vehicle management apparatus that are able to appropriately respond when a user is absent at the boarding location.

Means for Solving Problems

The present invention solves the above problem through specifying an available vehicle from among a plurality of vehicles as an in-use vehicle on the basis of a request from a user who requests use of a vehicle, setting a travel plan including a travel route of the in-use vehicle by way of a boarding location for the user on the basis of the request from the user, and, in a case in which the user is absent at the boarding location when the in-use vehicle arrives at the boarding location, setting a waiting time at the boarding location on the basis of the travel plan.

Effect of Invention

According to the present invention, it is possible to appropriately respond even when the user is absent at the boarding location.

BRIEF DESCRIPTION OF DRAWINGS

FIG. 6B is a flowchart illustrating the control flow of the shared vehicle management apparatus in the fourth embodiment.

FIG. 9B is a flowchart illustrating the control flow of the shared vehicle management apparatus in the sixth embodiment.

MODE(S) FOR CARRYING OUT THE INVENTION

Hereinafter, embodiments of the present invention will be described with reference to the drawings.

First Embodiment

The vehicle management apparatus and vehicle management method according to an embodiment of the present invention will be described below with reference to the drawings. The present embodiment will be described using an example in which the vehicle management apparatus according to the present embodiment is applied to a shared vehicle management system that manages and operates car-sharing. The car-sharing refers to a system configured such that a plurality of users shares a plurality of shared vehicles. The shared vehicles are allocated to a plurality of stations. In the car-sharing system of the present embodiment, the station from which a shared vehicle is rented and the station to which the shared vehicle is returned may be or may not be the same. Each station represents a place at which shared vehicles can be parked, rented, and returned and shared vehicles not in use can be on standby. Examples of such a station include parking facilities prepared for the car-sharing system.

Figure 1A:
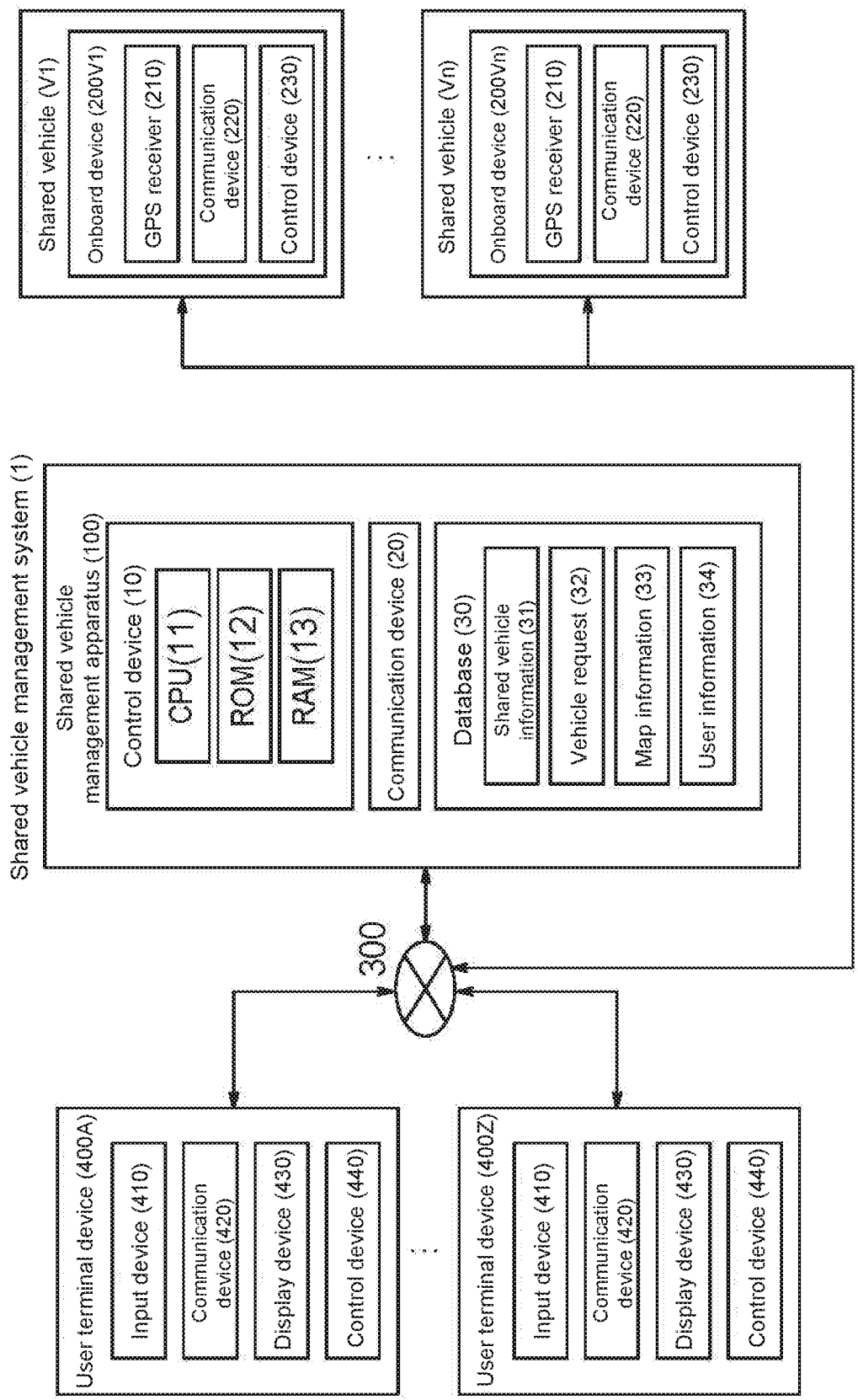
FIG. 1A is a block diagram of a shared vehicle management system including a vehicle management apparatus of a first embodiment.

FIG. 1A is a block diagram illustrating a shared vehicle management system 1 of the present embodiment. As illustrated in FIG. 1A, the shared vehicle management system 1 of the present embodiment includes a shared vehicle management apparatus 100, onboard devices 200V1 to 200Vn (which may be collectively referred to as an "onboard device 200Vn," hereinafter) provided respectively in shared vehicles V1 to Vn (which may be collectively referred to as a "shared vehicle Vn" or "shared vehicles Vn," hereinafter) used by the users, and user terminal devices 400A to 400Z (which may be collectively referred to as a "user terminal device 400A," hereinafter) carried by the users. The numbers of the onboard devices 200V1 to 200Vn and user terminal devices 400A to 400Z, which constitute the shared vehicle management system 1 of the present embodiment, are not limited.

The shared vehicle Vn of the present embodiment may be a vehicle having an autonomous (automated) driving function that allows for travel in an autonomous (automated) manner without a driver. The shared vehicle Vn includes a drive mechanism and a steering mechanism, and these mechanisms are controlled fully in an autonomous manner by the autonomous driving function. The shared vehicle Vn may have a manual driving function that allows for travel by the driver's driving operation, or may also be a vehicle capable of switching between the autonomous driving function and the manual driving function. Any autonomous driving technique known at the time of filing the present application can be appropriately used for the autonomous driving function of the present embodiment. The shared vehicle Vn may not have the autonomous driving function.

Examples of the shared vehicle Vn of the present embodiment include an electric car equipped with an electric motor as the drive source, an engine car equipped with an internal combustion engine as the drive source, and a hybrid car equipped with both an electric motor and an internal combustion engine as the drive sources. The electric cars and hybrid cars equipped with electric motors as the drive sources include those in which secondary batteries are used as power sources for the electric motors and those in which fuel cells are used as power sources for the electric motors.

The shared vehicle management apparatus 100, the onboard devices 200V1 to 200Vn, and the user terminal devices 400A to 400Z include respective communication devices (20, 220, and 420) and can exchange information with one another via an electric communication network such as the Internet 300. The communication path may be wired or wireless.

The user terminal device 400A of the present embodiment is a computer including a read only memory (ROM) that stores programs applied to the user terminal device 400A according to embodiments of the present invention, a central processing unit (CPU) as an operation circuit that executes the programs stored in the ROM to perform each function, and a random access memory (RAM) that serves as an accessible storage device. The user terminal device 400A of the present embodiment may be a personal computer, a smartphone, a personal digital assistant (PDA), or other handheld terminal device.

The user terminal device 400A of the present embodiment includes an input device 410 that receives input information (also referred to as a "vehicle request") for requesting the use of a shared vehicle Vn by each user, a communication device 420 that performs communication with external apparatuses such as the shared vehicle management apparatus 100, a display device 430 for notifying each user of information, and a control device 440 that executes a control process for the use of the shared vehicle Vn by the user.

As the input device 410 of the user terminal device 400A, for example, a device with which the user can input data by manual operation, such as a touch panel disposed on the display screen or a joystick, and/or a device with which the user can input data by voice, such as a microphone, can be used.

The display device 430 notifies the user of information received from the shared vehicle management apparatus 100. Examples of the display device 430 include a display. When a touch panel display is used, it can serve as both the display device 430 and the input device 410. The display device 430 receives information on the shared vehicle Vn which has been reserved and relevant information, for example, from the shared vehicle management apparatus 100 and notifies the user of the received information.

The control device 440 of the present embodiment uses a position acquisition device, such as a global positioning system (GPS) receiver (not illustrated), equipped in the user terminal device 400A to acquire information on the current position of the user who operates the user terminal device 400A. Examples of the information on the current position include information on the latitude and longitude. The control device 440 transmits the acquired information on the current position to the shared vehicle management apparatus 100 via the communication device 420. In the present embodiment, the control device 440 periodically transmits the information on the current position of each user to the shared vehicle management apparatus 100. This allows a control device 10 of the shared vehicle management apparatus 100, which will be described later, to acquire the current positional information of each user.

In addition, the control device 440 receives the input information, such as the vehicle request indicating that a user requests the use of a shared vehicle Vn, and transmits the received input information to the shared vehicle management apparatus 100 via the communication device 420. In the present embodiment, examples of the request for a shared vehicle Vn include a request form of immediate use with which the user starts to use the shared vehicle Vn immediately after transmitting information on the vehicle request. In the following description, the "information on the vehicle request" will be simply referred to as a "vehicle request."

The above-described vehicle request includes ID information of the user, information on the current position of the user, information on a departure place that is a point at which the user gets on the shared vehicle Vn and the shared vehicle Vn departs, ID information of the shared vehicle Vn which the user expects to use, information on a destination that is a point at which the shared vehicle Vn arrives and the user gets off the shared vehicle Vn, and a use start time that indicates the time from when the user starts the use of the shared vehicle Vn. The information on the departure place refers to information on a boarding location at which the user gets on the shared vehicle Vn, and the information on the destination refers to information on a deboarding location at which the user gets off the shared vehicle Vn. If necessary, the user terminal device 400A of the present embodiment may receive other information from the shared vehicle management apparatus 100, such as information on each station and information on candidates for the shared vehicle Vn in each station.

In the present embodiment, one or both of the user terminal device 400A and the onboard device 200Vn may serve as a navigation device for guiding a travel route of the shared vehicle Vn to the user. Examples of the scene of serving as a navigation device include a scene in which the user drives the shared vehicle Vn when the shared vehicle Vn is a vehicle capable of switching between the autonomous driving function and the manual driving function. When the user terminal device 400A serves as a navigation device, the user terminal device 400A may preliminarily store map information, for example, in a memory such as a ROM of the user terminal device 400A. The user terminal device 400A may display on the display device 430 the current position of the shared vehicle Vn which is currently used by the user and the position of the destination which is set by the user, together with the map information, and guide the travel route from the current position of the shared vehicle Vn to the destination.

The onboard device 200Vn of the present embodiment includes a GPS receiver 210 that detects the current position of each shared vehicle Vn, a communication device 220 that performs communication with external apparatuses such as the shared vehicle management apparatus 100, and a control device 230 that executes a control process for the use of the shared vehicle Vn by a user.

The onboard device 200Vn may be provided as a simple mechanism that utilizes functions of the user terminal device 400A. For example, when the user terminal device 400A is equipped with a GPS receiver, a communication device, devices for route calculation and route guidance, and/or other similar devices, the onboard device 200Vn may utilize their functions and perform only authentication of a user, which will be described below.

In the present embodiment, the control device 230 may use an authentication device (not illustrated) of the onboard device 200Vn to perform user authentication as to whether or not a user on board the shared vehicle Vn is identical with the user who has issued the vehicle request for the shared vehicle Vn. For example, the control device 230 uses a device capable of communication via the near field communication (NFC) as the authentication device to read ID information of the user, such as from the user terminal device 400A or membership card carried by the user. The control device 230 accesses the shared vehicle management apparatus 100 via the communication device 220 to acquire the information on the vehicle request for the shared vehicle Vn and performs the user authentication of the user on board the shared vehicle Vn.

The control device 230 transmits the information on the current position acquired using the GPS receiver 210 to the shared vehicle management apparatus 100 via the communication device 220.

The control device 230 notifies a user of the information transmitted from the shared vehicle management apparatus 100 and other information, such as using a display and/or a speaker, which are not illustrated. In the present embodiment, the control device 230 receives information regarding users who desire to share a ride on the shared vehicle Vn and other information from the shared vehicle management apparatus 100 and notifies the users of the received information. The ride-sharing and other similar terms as used in the present embodiment refer to a situation in which two or more persons get on one shared vehicle together and, for example, refer to a situation in which a user and one or more other users get on one shared vehicle.

In the present embodiment, like the above-described user terminal device 400A, the onboard device 200Vn may also serve as a navigation device for guiding the travel route from the current position of the shared vehicle Vn to the destination.

The shared vehicle management apparatus 100 of the present embodiment, which serves as a server of the shared vehicle management system 1, includes a control device 10 that executes control processes for managing and operating the car-sharing system, a communication device 20 that can communicate mutually with each of the onboard device 200Vn and the user terminal device 400A, and a database 30 that stores the information received by the communication device 20, the information on each shared vehicle Vn, and other necessary information. The communication device 20 can communicate not only with the user terminal device 400A and the onboard device 200Vn but also with a system that provides traffic information, such as a vehicle information and communication system (VICS) (registered trademark). Additionally or alternatively, the communication device 20 can communicate with a system that provides weather information.

The database 30 stores shared vehicle information 31, a vehicle request 32 received from a user, map information 33, and user information 34.

The shared vehicle information 31 is information regarding each shared vehicle Vn. The shared vehicle information 31 includes information on the current position of each shared vehicle Vn, information on the remaining power capacity and failure of each shared vehicle Vn, a current usage situation of each shared vehicle Vn, and other appropriate information. The shared vehicle information 31 also includes a schedule for each shared vehicle Vn indicating the situation of reservation by users for the shared vehicle Vn.

The vehicle request 32 is information that is input by each user via the user terminal device 400A. This information indicates requesting the use of a shared vehicle Vn. The vehicle request 32 includes ID information of the user, ID information of the shared vehicle Vn which the user expects to use, information on the current position of the user, information indicating the boarding location (departure place), deboarding location (destination), scheduled boarding time (scheduled departure time), scheduled deboarding time (estimated arrival time), etc., which are set by the user, and other information. The scheduled boarding time and the scheduled deboarding time may each be provided with a time width. For example, when the user wants to arrive at the deboarding location between 10:30 a.m. and 11:30 a.m., the estimated arrival time is indicated by a time having a width of about 30 minutes around 11:00 a.m. Likewise, the scheduled departure time is also indicated by a time having an arbitrary time width around a given time.

The map information 33 is map information that includes information on roads, facilities, and the like. The information on facilities includes, for example, information regarding the structure of a building representing the number of floors of the building, the passages of the building, the entrance and exit of the building, and the like. Additionally or alternatively, the map information 33 includes, for example, positional information of each station, information on facilities around each station, and information regarding each station, such as the traffic situation around each station and the usage situation of each station.

The user information 34 is information on all the users who can use the car-sharing system. The user information 34 includes ID information of all the users and information on the current positions of all the users. For example, the communication device 20 receives the current positional information of each user at predetermined intervals from the user terminal device 400A of each user thereby to allow the current positional information of each user to be stored as the user information 34.

As illustrated in FIG. 1A, the control device 10 of the shared vehicle management apparatus 100 of the present embodiment includes a read only memory (ROM) 12 that stores programs for executing processes to manage and operate the car-sharing system, a central processing unit (CPU) 11 as an operation circuit that executes the programs stored in the ROM 12 to serve as the shared vehicle management apparatus 100, and a random access memory (RAM) 13 that serves as an accessible storage device.

Figure 1B:
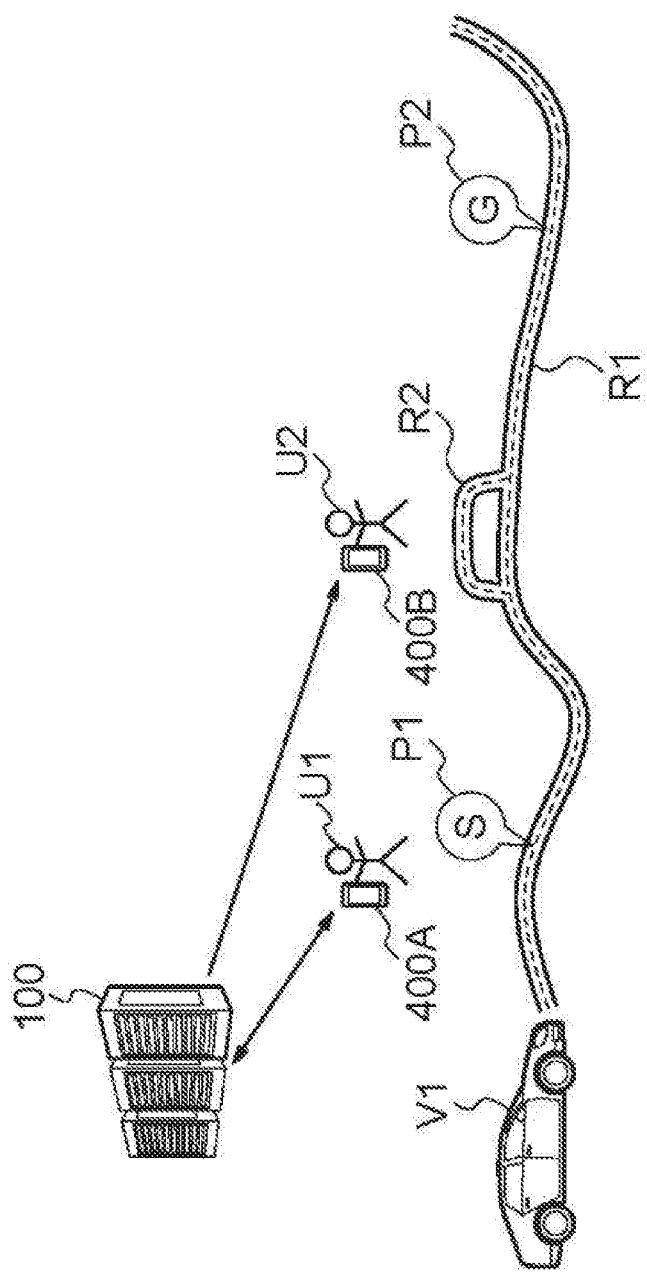
FIG. 1B is a schematic diagram illustrating an example of a method for users to use a shared vehicle in the shared vehicle management system including the vehicle management apparatus of the first embodiment.

An example of the form of car-sharing will be described with reference to FIG. 1B. FIG. 1B is a schematic diagram illustrating an example of a method for a user U1 to use a shared vehicle V1 in the shared vehicle management system 1 of the present embodiment. FIG. 1B illustrates a scene in which the user U1 uses the user terminal device 400A and expects to move from a departure place P1 set by the user U1 to a destination P2 using the shared vehicle V1.

For example, when the user U1 inputs the departure place P1 and the destination P2 to the user terminal device 400A in the scene illustrated in FIG. 1B, the input information is transmitted from the user terminal device 400A to the shared vehicle management apparatus 100 as a vehicle request with which the user U1 requests the use of a shared vehicle.

The shared vehicle management apparatus 100 transmits a move command for moving to the departure place P1 and picking up the user U1 to the shared vehicle V1 which is selected on the basis of the vehicle request from the user. The move command includes a travel route from the current position of the shared vehicle V1 to the departure place P1 and a travel route R1 from the departure place P1 to the destination P2. When receiving the move command from the shared vehicle management apparatus 100, the shared vehicle V1 uses the autonomous driving function to travel to the departure place P1 in an autonomous manner without a driver. Then, when the user U1 gets on the shared vehicle V1 at the departure place P1, the shared vehicle V1 travels in an autonomous manner to the destination P2 along the travel route R1 included in the move command. When the shared vehicle V1 arrives at the destination P2, the user U1 gets off the shared vehicle V1 and completes the use of the shared vehicle V1. Thereafter, the shared vehicle V1 moves to a station within a predetermined range from the destination P2.

In the present embodiment, the user can set arbitrary points such as a railway station and a commercial facility as the departure place and the destination.

In the scene illustrated FIG. 1B, user U2 is a user, like the user U1, who can use the shared vehicle V1. For example, when the car-sharing system is a members-only system for those registered as users, both the user U1 and the user U2 are the members registered as users. The user U2 operates the user terminal device 400B to transmit the vehicle request to the shared vehicle management apparatus 100.

The shared vehicle management apparatus 100 selects a shared vehicle Vn that matches the vehicle request from the user U2. Shared vehicles as candidates for selection include not only a shared vehicle Vn that is not used by another user (a shared vehicle Vn that is not reserved by another user) but also a shared vehicle Vn that is currently used by another user (a shared vehicle Vn on which another user is currently on board). That is, when the user U2 gets on a shared vehicle Vn used by the user U1, the users U1 and U2 share a ride on the shared vehicle Vn.

The user U2 uses the user terminal device 400B to receive information including a travel plan for the shared vehicle V1 and information for confirming whether or not to desire ride-sharing from the shared vehicle management apparatus 100. The travel plan includes a travel route R2 for the user U2 to share a ride with the user U1. The user U2 confirms the travel plan such as a travel route displayed on the user terminal device 400B and transmits information indicative of the use of and ride-sharing on the shared vehicle V1 to the shared vehicle management apparatus 100.

The shared vehicle management apparatus 100 changes the travel plan for the shared vehicle V1 from the travel route R1 without ride-sharing to the travel route R2 with ride-sharing because the situation in which the user U1 uses the shared vehicle V1 alone is changed to a situation in which the user U1 and the user U2 share the use of the shared vehicle V1. As the travel route is changed, the estimated arrival time for the user U1 to arrive at the destination will be delayed.

Figure 2:
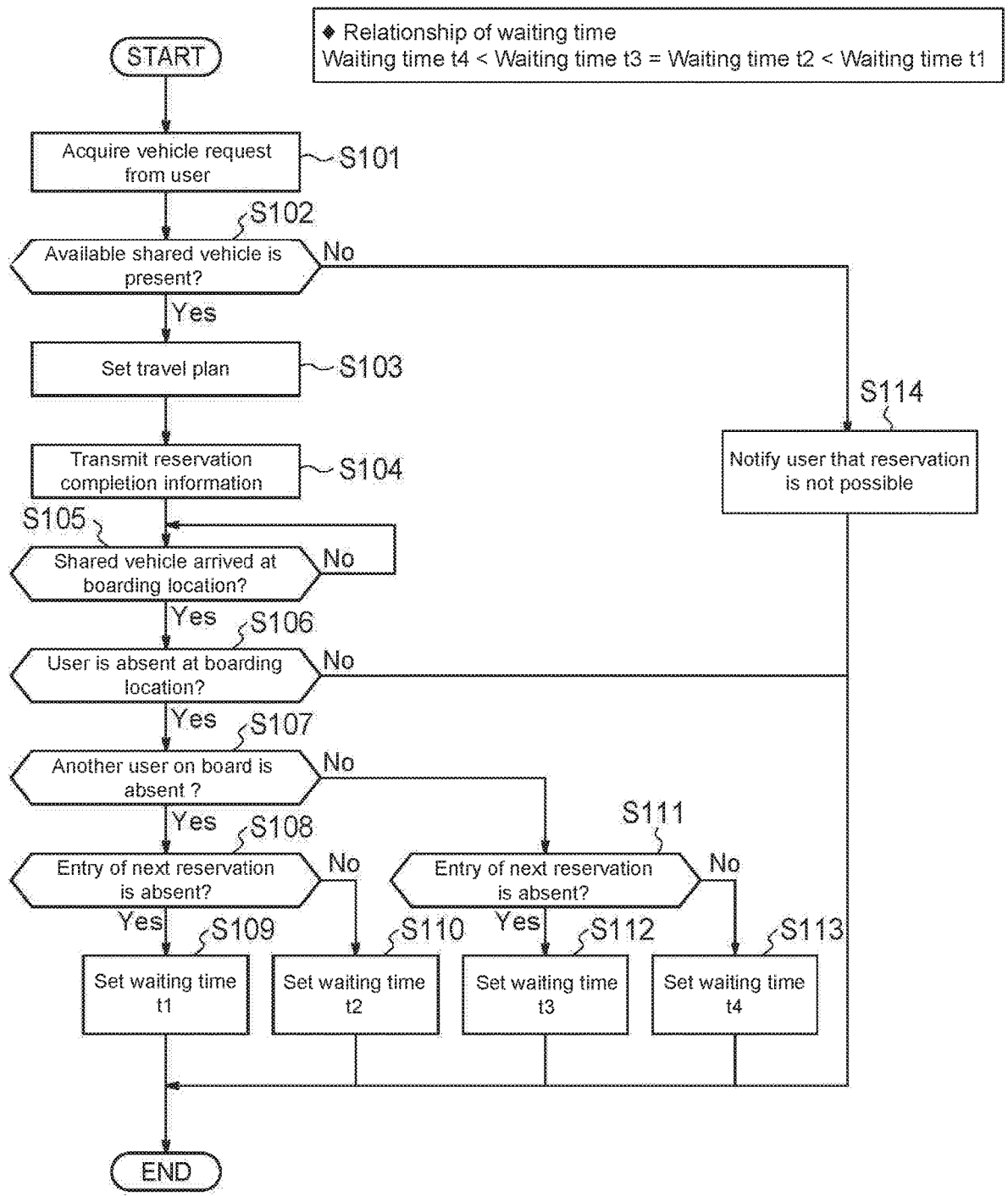
FIG. 2 is a flowchart illustrating a control flow of a shared vehicle management apparatus.

Specific control executed by the shared vehicle management apparatus 100 will be described below. FIG. 2 is a flowchart illustrating a control flow of the control device 10 of the shared vehicle management apparatus 100.

In step S101, the control device 10 communicates with the user terminal device 400A and acquires the vehicle request from a user. The vehicle request is represented by a number of information items that are set by the user for the use of a shared vehicle Vn. Examples of the vehicle request include a boarding location, a deboarding location, a desired boarding time, and a desired deboarding time. The boarding location and the deboarding location are locations that are set by the user, for example, on the map displayed on the display device 430 of the user terminal device 400A. The boarding location and the deboarding location are each indicated, for example, by the latitude and longitude. The boarding location and the deboarding location may each be set in terms of an area such as an area around the Yokohama station.

The desired boarding time and the desired deboarding time may each be set not only to a specific time but also within a time slot such as from 8:00 a.m. to 9:00 a.m. The vehicle request may not necessarily include the desired boarding time or the desired deboarding time. For example, when the user requests to get on a shared vehicle Vn as soon as possible, the vehicle request does not include the desired boarding time. The vehicle request may include the presence or absence of a request for ride-sharing. For example, when the usage fee for a shared vehicle Vn at the time of ride-sharing is lower than the usage fee without ride-sharing, the vehicle request may include the presence or absence of a request for ride-sharing so as to allow the user to request the ride-sharing when requesting the use of a shared vehicle Vn.

In step S102, the control device 10 specifies an available vehicle from among a plurality of shared vehicles Vn on the basis of the vehicle request acquired from the user. The control device 10 selects a shared vehicle Vn that matches the vehicle request. For example, the control device 10 selects a shared vehicle Vn closest to the boarding location set in the vehicle request as a candidate for the available vehicle. When the boarding location and the desired boarding time are included in the vehicle request, the control device 10 determines whether or not the shared vehicle Vn can arrive at the boarding location by the desired boarding time. When a determination is made that the shared vehicle Vn can arrive at the boarding location by the desired boarding time, the control device 10 determines that the shared vehicle Vn is available. When the shared vehicle Vn is available, the control device 10 executes the control process of step S103. When the shared vehicle Vn is not available, that is, when a shared vehicle Vn that matches the vehicle request cannot be specified, the control device 10 executes the control process of step S114.

In step S103, the control device 10 calculates and sets a travel plan on the basis of the vehicle request. The travel plan is determined by the position coordinates of the boarding location, the position coordinates of the deboarding location, the travel route of the selected shared vehicle Vn, the scheduled departure time at the boarding location, and the estimated arrival time at the deboarding location. The scheduled departure time corresponds to the scheduled boarding time for the user, and the estimated arrival time corresponds to the scheduled deboarding time for the user. The control device 10 performs a route calculation from the boarding location to the deboarding location thereby to calculate a travel route to the boarding location which is set by the user. In the following description, "setting a travel plan" refers to the meaning of "calculating a travel plan and then setting the calculated travel plan."

In step S104, the control device 10 transmits reservation completion information including the travel plan to the user terminal device 400 using the communication device 420. The reservation completion information includes information on the vehicle selected in the control process of step S102 and information indicating that the reservation for the shared vehicle V1 has been completed. In the subsequent steps, for descriptive purposes, it is assumed that the available shared vehicle Vn specified in step S102 (also referred to as an in-use vehicle) is the shared vehicle V1.

In the control process of step S102, when there is no available shared vehicle Vn, the process proceeds to step S114, in which the control device 10 notifies the user that reservation is not possible, and terminates the control flow.

The control process after the start of using the shared vehicle will then be described. In step S104, when the control device 10 transmits the reservation completion information, the shared vehicle V1 starts traveling to the boarding location in accordance with the travel plan, which is set in step S103, to pick up the user who made the reservation.

In step S105, the control device 10 determines whether or not the shared vehicle V1 has arrived at the boarding location for the user. The control device 10 uses the information on the current position of the shared vehicle V1, which is transmitted from the shared vehicle V1, to determine whether or not the shared vehicle V1 has arrived at the boarding location. When a determination is made that the shared vehicle V1 has arrived at the boarding location, the process proceeds to step S106. On the other hand, when a determination is made that the shared vehicle V1 has not arrived at the boarding location, the process waits in step S105. When the shared vehicle V1 has arrived at the boarding location by the scheduled boarding time, the control device 10 determines that the shared vehicle V1 has arrived at the boarding location. In the present embodiment, the shared vehicle V1 is programmed to arrive at the boarding location on time in accordance with the scheduled boarding time when traveling by the autonomous driving function.

In step S106, the control device 10 determines whether or not the user is present at the boarding location. The control device 10 uses the information on the current position of the user, which is transmitted from the user terminal device 400A, to determine whether or not the user is present at the boarding location. The control device 10 determines whether or not the user has arrived at the boarding location. When the user is absent at the boarding location, the process proceeds to step S107. On the other hand, when the user is present at the boarding location or when the user has arrived at the boarding location by the scheduled boarding time, the control flow is terminated.

When the user inputs the scheduled boarding time as a time having an arbitrary time width around a given time, the control device 10 determines in step S105 or S106 whether or not the shared vehicle V1 has arrived within the scheduled boarding time slot or whether or not the user is present within the scheduled boarding time slot. For example, when the user wants to get on the shared vehicle V1 at the boarding location within a time slot from 9:30 a.m. to 10 a.m., the control device 10 determines in step S105 whether or not the shared vehicle V1 has arrived at the boarding location within the time slot from 9:30 a.m. to 10 a.m. In step S106, the control device 10 determines whether or not the user is present at the boarding location within the time slot from 9:30 a.m. to 10:00 a.m.

In step S107, the control device 10 determines whether or not another user is on board the shared vehicle V1. Another user refers to a user different from the user who is determined to be absent at the boarding location in step S106. For example, the control device 10 refers to the reservation schedule for the shared vehicle V1, which is stored in the database 30, thereby to confirm the presence or absence of a user who already uses the shared vehicle V1 and determine whether or not another user is already on board the shared vehicle V1. When the current time falls within a time slot reserved by another user on the reservation schedule, the control device 10 determines that another user is on board the shared vehicle V. On the other hand, when confirming that the user absent at the boarding location corresponds to the first user who uses the shared vehicle V1 on the reservation schedule, the control device 10 determines that there is no user on board.

The method of confirming whether or not there is a user on board is not limited to the confirmation of the reservation schedule. For example, the control device 10 may use the information on the current position of a user, which is transmitted from the user terminal device 400A, to determine whether or not another user is on board the shared vehicle V1. Additionally or alternatively, when the shared vehicle V1 is equipped with an imaging device (e.g., a camera) that captures an image in the vehicle interior, the control device 10 may use the captured image in the vehicle interior, which is included in the probe data and captured by the imaging device, to determine whether or not another user is on board.

When a determination is made that another user is not on board, the process proceeds to step S108. On the other hand, when a determination is made that another user is on board, the process proceeds to step S11.

In step S108, the control device 10 determines whether or not a next reservation for the shared vehicle V1 is entered. The next reservation refers to a reservation made by a user who uses the shared vehicle V1 from now or plans to use the shared vehicle V1. The control device 10 refers to the reservation schedule for the shared vehicle V1, which is stored in the database 30, thereby to confirm whether or not a next reservation for the shared vehicle V1 is entered and determine whether or not there is a next reservation. When a determination is made that a next reservation for the shared vehicle V1 is not entered, the process proceeds to step S109. On the other hand, when a determination is made that a next reservation for the shared vehicle V1 is entered, the process proceeds to step S110.

In step S109, the control device 10 sets a waiting time at the boarding location in order to wait for the user absent at the boarding location. In the present embodiment, the control device 10 acquires a predetermined waiting time stored in the database 30 and sets the waiting time.

The database 30 stores the waiting time which is different in accordance with the determination result as to whether or not another user is on board and the determination result as to whether or not there is a next reservation for the shared vehicle V1. In step S109, the control device 10 acquires from the database 30 a waiting time $t_1$ corresponding to a condition in which another user is not on board and a next reservation for the shared vehicle V1 is not entered, and sets the waiting time $t_1$ as the waiting time at the boarding location.

When in step S108 a determination is made that a next reservation for the shared vehicle V1 is entered, the process proceeds to step S110. In step S110, the control device 10 sets a waiting time as in step S109. In step S110, the control device 10 acquires from the database 30 a waiting time $t_2$ corresponding to a condition in which another user is not on board and a next reservation for the shared vehicle V1 is entered, and sets the waiting time $t_2$ as the waiting time at the boarding location.

The control flow when another user is on board will then be described. When in step S107 a determination is made that another user is on board, the process proceeds to step S111. In step S111, the control device 10 determines whether or not a next reservation for the shared vehicle V1 is entered. The process in this step is the same process as in step S108. When a determination is made that a next reservation for the shared vehicle V1 is not entered, the process proceeds to step S112. On the other hand, when a determination is made that a next reservation for the shared vehicle V1 is entered, the process proceeds to step S113.

In step S112, the control device 10 sets a waiting time as in steps S109 and S110. In step S112, the control device 10 acquires from the database 30 a waiting time $t_3$ corresponding to a condition in which another user is on board and a next reservation for the shared vehicle V1 is not entered, and sets the waiting time $t_3$ as the waiting time at the boarding location.

When in step S111 a determination is made that a next reservation for the shared vehicle V1 is entered, the process proceeds to step S113. In step S113, the control device 10 sets a waiting time as in steps S109, S110, and S112. In step S113, the control device 10 acquires from the database 30 a waiting time $t_4$ corresponding to a condition in which another user is on board and a next reservation for the shared vehicle V1 is entered, and sets the waiting time $t_4$ as the waiting time at the boarding location.

When the processes of steps S109, S110, S112, and S113 are completed, the control device 10 terminates the control flow.

Here, the length of the waiting time will be described for each of the waiting time $t_1$ to the waiting time $t_4$. In the present embodiment, the waiting time $t_1$ is the longest waiting time, and the waiting time decreases in the order of the waiting time $t_2$, the waiting time $t_3$, and the waiting time $t_4$. For example, when the priority level of the presence of a user on board and the priority of the presence of a reservation are considered to be the same, the waiting time $t_2$ has the same length as that of the waiting time $t_3$. The length of each waiting time is based on the determination result as to whether or not another user is on board and the determination result as to whether or not there is a next reservation for the shared vehicle V1. For example, in a situation in which another user is not on board the shared vehicle V1, the waiting time is different depending on whether or not a next reservation for the shared vehicle V1 is entered. When a next reservation for the shared vehicle V1 is not entered, the shared vehicle V1 can wait for the user at the boarding location as much as possible, whereas when a next reservation for the shared vehicle V1 is entered, the waiting time is limited (waiting time $t_2$<waiting time $t_1$) because the shared vehicle V1 has the next schedule. Likewise, when another user is on board, the waiting time is limited (waiting time $t_3$, waiting time $t_4$<waiting time $t_1$, waiting time $t_2$) because the shared vehicle V1 is operated in accordance with the travel plan which is set on the basis of the vehicle request from the other user. Preferably, the waiting time $t_1$ to the waiting time $t_4$ are each an experimentally determined time. The relationship of the lengths of the waiting time $t_1$ to the waiting time $t_4$ is merely an example and is not particularly limited. For example, the waiting times $t_1$ to $t_4$ may all have different lengths.

As described above, in the present embodiment, the vehicle request indicating a request for the use of a shared vehicle is acquired from a user, and an available vehicle is specified as an in-use vehicle from among a plurality of shared vehicles on the basis of the acquired vehicle request. In addition, the travel plan including a travel route of the in-use vehicle by way of the boarding location for the user is set on the basis of the vehicle request from the user. In a case in which the user is absent at the boarding location when the in-use vehicle arrives at the boarding location, the waiting time at the boarding location is set on the basis of the travel plan. Through this operation, even when the user is absent at the boarding location for some reason, it is possible to perform an appropriate response of waiting for the user at the boarding location within a time period in which the travel plan for the shared vehicle V1 is not hindered.

Moreover, in the present embodiment, a determination is made as to whether or not another user is on board the in-use vehicle and a determination is made as to whether or not a reservation for the in-use vehicle is entered by the user who plans to use the in-use vehicle. Then, the waiting time is set in accordance with a determination result as to whether or not another user is on board the in-use vehicle and a determination result as to whether or not a next reservation for the in-use vehicle is entered. Through this operation, when another user is not on board the in-use vehicle, the user can be waited at the boarding location for a longer time than when another user is on board the in-use vehicle. Furthermore, when a next reservation for the in-use vehicle is not entered, the user can be waited at the boarding location for a longer time than when a next reservation for the in-use vehicle is entered. As a result, it is possible to wait for the user at the boarding location for an appropriate time in accordance with the current situation of the in-use vehicle and the next schedule for the in-use vehicle.

In the present embodiment, as illustrated in FIG. 2, after a determination is made in step S107 as to whether or not another user is on board the in-use vehicle, a determination is made in step S108 or S111 as to whether or not a next reservation for the in-use vehicle is entered, but the order of the determinations is not particularly limited. For example, after a determination is made as to whether or not a next reservation for the in-use vehicle is entered, a determination may be made as to whether or not another user is on board the in-use vehicle.

Second Embodiment

Figure 3:
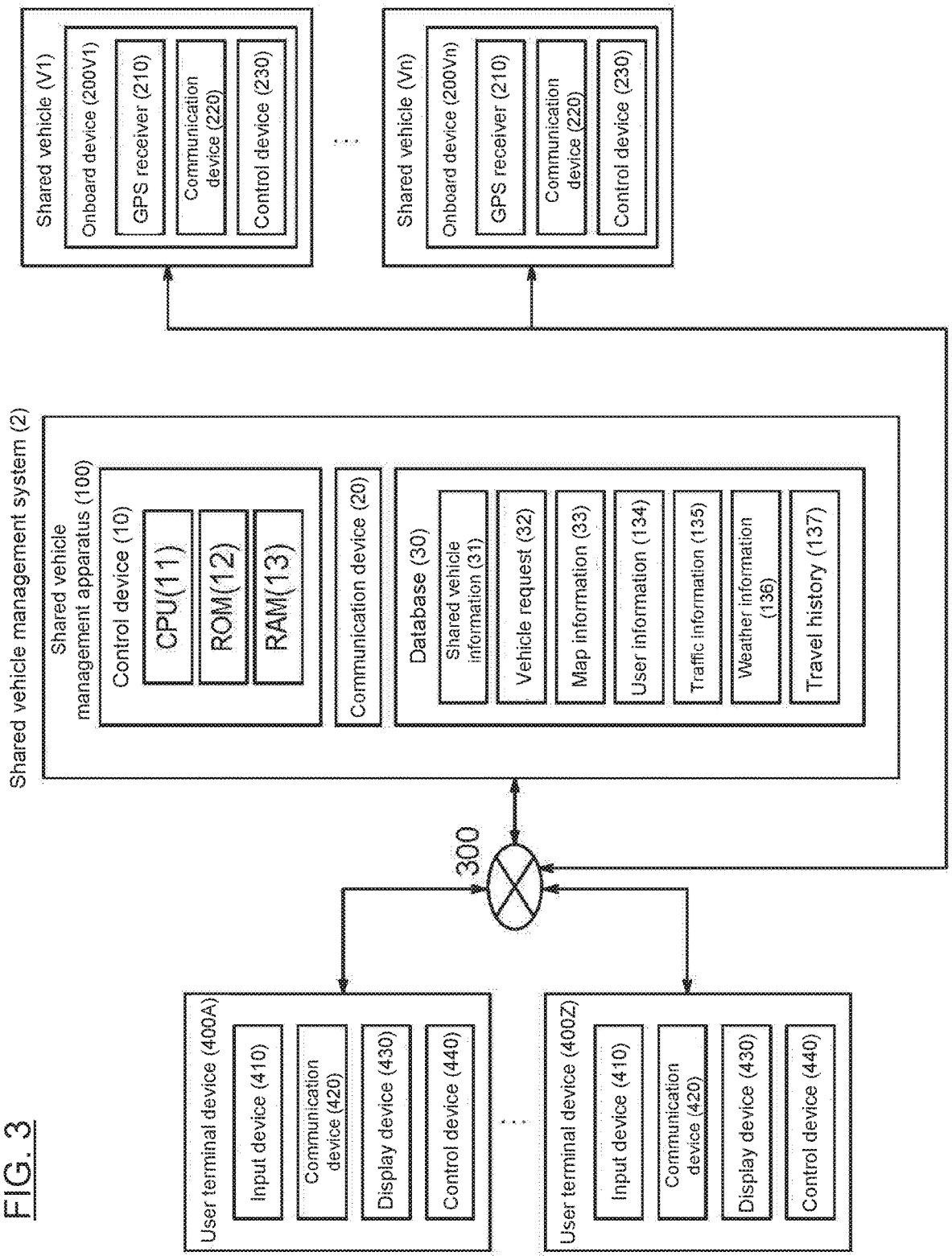
FIG. 3 is a block diagram of a shared vehicle management system including a vehicle management apparatus of a second embodiment.

The vehicle management method or vehicle management apparatus according to another embodiment of the present invention will be described with reference to FIG. 3. In the present embodiment, information stored in a database 130 and a part of the control process for setting the waiting time executed by the control device 10 are different from those in the above-described first embodiment. Other configurations and control processes are the same as those in the first embodiment, and the description of the first embodiment will be borrowed herein as appropriate.

The database 130 of the present embodiment stores not only the shared vehicle information 31, the vehicle request 32, and the map information 33, which are stored in the database 30 in the first embodiment, but also user information 134, traffic information 135, weather information 136, and a travel history 137.

The user information 134 of the present embodiment includes not only the ID information of all the users and the current positional information of all the users but also information on the schedule for each user. The information on the schedule for a user includes a schedule other than the schedule for using a shared vehicle Vn. For example, it is assumed that the user terminal device 400A is equipped with a schedule management application for scheduling and the user has input a schedule to this application. In this case, the communication device 20 receives information on the schedule for each user from the user terminal device 400A at predetermined intervals, and the information on the schedule for each user can thereby be stored as the user information 134.

The method of acquiring the schedule for a user is not limited to acquisition from the user terminal device 400A. For example, a configuration may be employed in which when the vehicle request for a shared vehicle is transmitted, a schedule for the date of use of the shared vehicle is input with a predetermined input form.

The traffic information 135 is information on traffic regulations and traffic congestions. Examples of the traffic information 135 include information received from the VICS via the communication device 20. The traffic information 135 includes road congestion information (such as a vehicle speed and a time required for passing) and accident information.

The weather information 136 is information on the weather in an area around the area in which the shared vehicle Vn is used.

The travel history 137 is a travel history of the shared vehicle Vn. The travel history 137 includes, for each shared vehicle Vn, information on the user who used the shared vehicle Vn (such as the user ID), a travel route including the boarding location and deboarding location for each user, and a time required for moving from the boarding location to the deboarding location.

Figure 4:
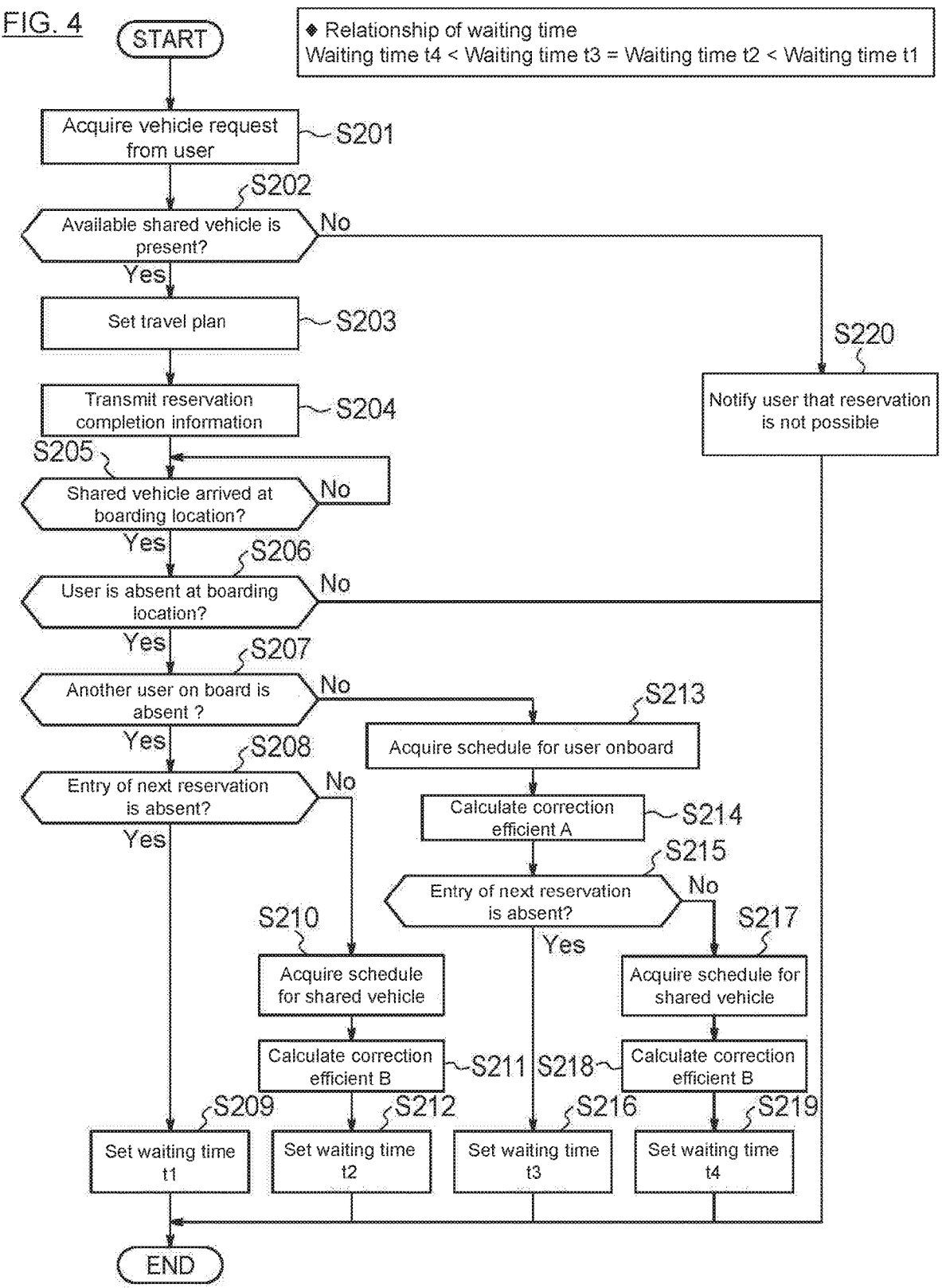
FIG. 4 is a flowchart illustrating a control flow of a shared vehicle management apparatus in the second embodiment.

The control flow of the shared vehicle management apparatus 100 in a shared vehicle management system 2 of the present embodiment will then be described. FIG. 4 is a flowchart illustrating a control flow of the control device 10 of the shared vehicle management apparatus 100. The control processes of steps S201 to S209 and S220 are the same as the control processes of steps S101 to S109 and S114, so the description of each step will be borrowed herein.

When in step S208 a determination is made that a next reservation for the shared vehicle V1 is entered, the process proceeds to step S210.

In step S210, the control device 10 acquires information on the schedule for the shared vehicle V1. For example, the control device 10 refers to the shared vehicle information 31, which is stored in the database 130, to acquire the information on the schedule for the shared vehicle V1 being used.

In step S211, the control device 10 calculates a correction coefficient. The correction coefficient refers to a coefficient for correcting a predetermined waiting time (any of the waiting times $t_1$ to $t_4$). The control device 10 calculates the correction coefficient on the basis of the schedule for the shared vehicle V1 acquired in step S210. For example, even if the shared vehicle V1 makes a stop at the boarding location for the waiting time $t_2$ to wait for the arrival of the user, when the time until a next reservation for the shared vehicle V1 is not less than a predetermined time, the control device 10 determines that the use of the shared vehicle V1 can be started on time as scheduled for the next reservation even when the predetermined waiting time $t_2$ is lengthened. In this case, for example, the control device 10 sets the correction coefficient such that the waiting time is the longest within a range in which the use of the shared vehicle V1 can be started on time as scheduled for the next reservation. On the other hand, if the shared vehicle V1 makes a stop at the boarding location for the waiting time $t_2$ to wait for the arrival of the user, when the time until the next reservation for the shared vehicle V1 is less than the predetermined time, the control device 10 determines that the use of the shared vehicle V1 cannot be started on time as scheduled for the next reservation due to the predetermined waiting time $t_2$. In this case, for example, the control device 10 sets the correction coefficient such that the waiting time is shortened to a time that allows the use of the shared vehicle V1 to be started on time as scheduled for the next reservation. For descriptive purposes, the correction coefficient calculated based on the schedule for the shared vehicle will be described as a correction coefficient B. The predetermined time is preferably an experimentally determined time.

In step S212, the control device 10 sets a waiting time. Specifically, the control device 10 acquires the waiting time $t_2$ from the database 130 and multiplies the waiting time $t_2$ by the correction coefficient B, which is calculated in step S211, to set the resulting waiting time B×$t_2$ as a waiting time at the boarding location.

The control flow when another user is on board will then be described. When in step S207 a determination is made that another user is on board, the process proceeds to step S213. In step S213, the control device 10 acquires information on a schedule for the user on board. For example, the control device 10 acquires information on a schedule associated with the user ID of the user on board from the user information 134 stored in the database 130.

In step S214, the control device 10 calculates a correction coefficient. The control device 10 calculates the correction coefficient on the basis of the schedule for the user on board acquired in step S213. For example, when the time from the current time to the next schedule for the user is not less than a predetermined time, the control device 10 determines that the next schedule for the user is not hindered even when the predetermined waiting time $t_3$ or $t_4$ is lengthened. In this case, for example, the control device 10 sets the correction coefficient such that the waiting time is the longest within a range in which the next schedule for the user is not hindered. On the other hand, when the time from the current time to the next schedule for the user is less than the predetermined time, the control device 10 determines that the next schedule for the user is hindered due to the predetermined waiting time $t_3$ or $t_4$. In this case, for example, the control device 10 sets the correction coefficient such that the waiting time is shortened to a time during which the next schedule for the user is not hindered. For descriptive purposes, the correction coefficient calculated based on the schedule for the user will be described as a correction coefficient A.

In step S215, the control device 10 determines whether or not a next reservation for the shared vehicle V1 is entered. The process in this step is the same process as in step S208. When a determination is made that a next reservation for the shared vehicle V1 is not entered, the process proceeds to step S216. On the other hand, when a determination is made that a next reservation for the shared vehicle V1 is entered, the process proceeds to step S217.

In step S216, the control device 10 sets a waiting time. Specifically, the control device 10 acquires the waiting time $t_3$ from the database 130 and multiplies the waiting time $t_3$ by the correction coefficient A, which is calculated in step S214, to set the resulting waiting time $A \times t_3$ as a waiting time at the boarding location.

When in step S215 a determination is made that a next reservation for the shared vehicle V1 is entered, the process proceeds to step S217. In step S217, the control device 10 acquires information on the schedule for the shared vehicle V1. The process in this step is the same process as in step S210.

In step S218, the control device 10 calculates a correction coefficient. The process in this step is the same process as in step S211. It is assumed that the correction coefficient calculated by the control device 10 is the correction coefficient B.

In step S219, the control device 10 sets a waiting time. Specifically, the control device 10 acquires the waiting time $t_4$ from the database 130 and multiplies the waiting time $t_4$ by the correction coefficients A and B, which are calculated in steps S214 and S218, respectively, to set the resulting waiting time $A \times B \times t_4$ as a waiting time at the boarding location.

When the processes of steps S209, S212, S216, and S219 are completed, the control device 10 terminates the control flow.

As described above, in the present embodiment, the schedule for the in-use vehicle and the schedule for the user on board the in-use vehicle are acquired, and the correction coefficient is calculated on the basis of the acquired schedules. Then, a predetermined waiting time is multiplied by the correction coefficient to set the waiting time. This allows the predetermined waiting time to be corrected to an appropriate waiting time in accordance with the schedule for the in-use vehicle and the schedule for the user on board. As a result, it is possible to wait for a user at the boarding location for an appropriate waiting time with respect to the schedule for the in-use vehicle and the schedule for the user on board without hindering the schedule for the in-use vehicle and the schedule for the user on board.

In the present embodiment, the description has been made using the schedule for the shared vehicle Vn and the schedule for the user on board as factors for correcting the waiting time, but the factors for correcting the waiting time are not limited to the above.

In a modified example of the present embodiment, the control device 10 acquires the schedule for a user absent at the boarding location and calculates a correction coefficient on the basis of the acquired schedule. For example, regardless of the determination result in step S207 as to whether or not another user is on board, the control device 10 acquires the schedule for a user absent at the boarding location, that is, a user who plans to board, in a step subsequent to step S207.

As in step S210, the control device 10 acquires information on the schedule associated with the user ID of a user who plans to board, from the user information 134 stored in the database 130.

Then, the control device 10 calculates a correction coefficient on the basis of the schedule for the user who plans to board. For example, when the time from the current time to a next schedule for the user is not less than a predetermined time, the control device 10 determines that the next schedule for the user is not hindered even when the predetermined waiting times $t_2$ to $t_4$ are lengthened. In this case, for example, the control device 10 sets the correction coefficient such that the waiting time is the longest within a range in which the next schedule for the user is not hindered. On the other hand, when the time from the current time to the next schedule for the user is less than the predetermined time, the control device 10 determines that the next schedule for the user is hindered due to the predetermined waiting times $t_2$ to $t_4$. In this case, for example, the control device 10 sets the correction coefficient such that the waiting time is shortened to a time during which the next schedule for the user is not hindered.

In a step of setting the waiting time (any of steps S212, S216, and S219 illustrated in FIG. 4), the control device 10 multiplies the predetermined waiting time by the correction coefficient, which is calculated on the basis of the schedule for the user who plans to board, to set the waiting time at the boarding location.

As described above, in the modified example of the present embodiment, not only the schedule for the in-use vehicle and the schedule for the user on board the in-use vehicle, but also the schedule for the user who plans to get on the in-use vehicle is acquired, and the waiting time is set on the basis of the acquired schedules. This allows the predetermined waiting time to be corrected to an appropriate waiting time in accordance not only with the schedule for the in-use vehicle and the schedule for the user on board but also with the schedule for the user absent at the boarding location. As a result, an appropriate waiting time suitable for the schedules for the users who use the shared vehicle Vn can be set regardless of the order of use of the shared vehicle Vn.

In another modified example of the present embodiment, traffic information, weather information, and/or a travel history of the shared vehicle Vn are used as factors for correcting the waiting time. For example, after determining in step S208 or S215 illustrated in FIG. 4 that a next schedule for the shared vehicle Vn is entered, the control device 10 of another modified example acquires the traffic information 135, the weather information 136, and/or the travel history 137 from the database 130. The control device 10 may acquire at least one information item from the database 130 rather than acquiring all the information items from the database 130.

For example, the control device 10 acquires a road situation included in the traffic information 135. When acquiring the traffic congestion information of the road to a next destination, the control device 10 determines that the required time to the next destination is lengthened, and sets the correction coefficient such that the predetermined waiting time is shortened. On the other hand, when there are no traffic congestion information, no accident information, etc., the control device 10 determines that the required time to the next destination can be shortened, and sets the correction coefficient such that the waiting time is lengthened.

Additionally or alternatively, for example, the control device 10 acquires current weather information included in the weather information 136. When acquiring information indicating that the current weather is rain, the control device 10 determines that the required time to a next destination is lengthened because there are more users of vehicles than in clear weather and roads are congested, and the control device 10 sets the correction coefficient such that the predetermined waiting time is shortened. On the other hand, when acquiring information indicating that the current weather is clear weather, the control device 10 sets the correction coefficient such that the predetermined waiting time is lengthened.

Additionally or alternatively, for example, the control device 10 acquires information on the history of moving time to a next destination included in the travel history 137. When the moving time to the next destination in the history information is shorter than the moving time to the next destination in the travel plan, the control device 10 sets the correction coefficient such that the predetermined waiting time is shortened. On the other hand, when the moving time to the next destination in the history information is longer than the moving time to the next destination in the travel plan, the control device 10 sets the correction coefficient such that the predetermined waiting time is lengthened.

Then, in a step of setting the waiting time (any of steps S212, S216, and S219 illustrated in FIG. 4), the control device 10 multiplies the predetermined waiting time by the correction coefficient, which is calculated on the basis of at least one of the traffic information 135, the weather information 136, and the travel history 137, to set the waiting time at the boarding location.

As described above, in another modified example of the present embodiment, at least one information item of the traffic information, the weather information, and the travel history of the shared vehicle is acquired, and the waiting time is set on the basis of the acquired information item. This allows the predetermined waiting time to be corrected to an appropriate waiting time suitable for the current traffic situation and/or the current weather situation. Moreover, the predetermined waiting time can be corrected to a waiting time based on the past results. As a result, an appropriate waiting time can be set for the situation in which the shared vehicle Vn is used.

Third Embodiment

The vehicle management method or vehicle management apparatus according to another embodiment of the present invention will be described. In the present embodiment, the control after setting the waiting time is different from that in the above-described first embodiment. Other configurations and control processes are the same as those in the first embodiment, and the description of the first embodiment will be borrowed herein.

Figure 5:
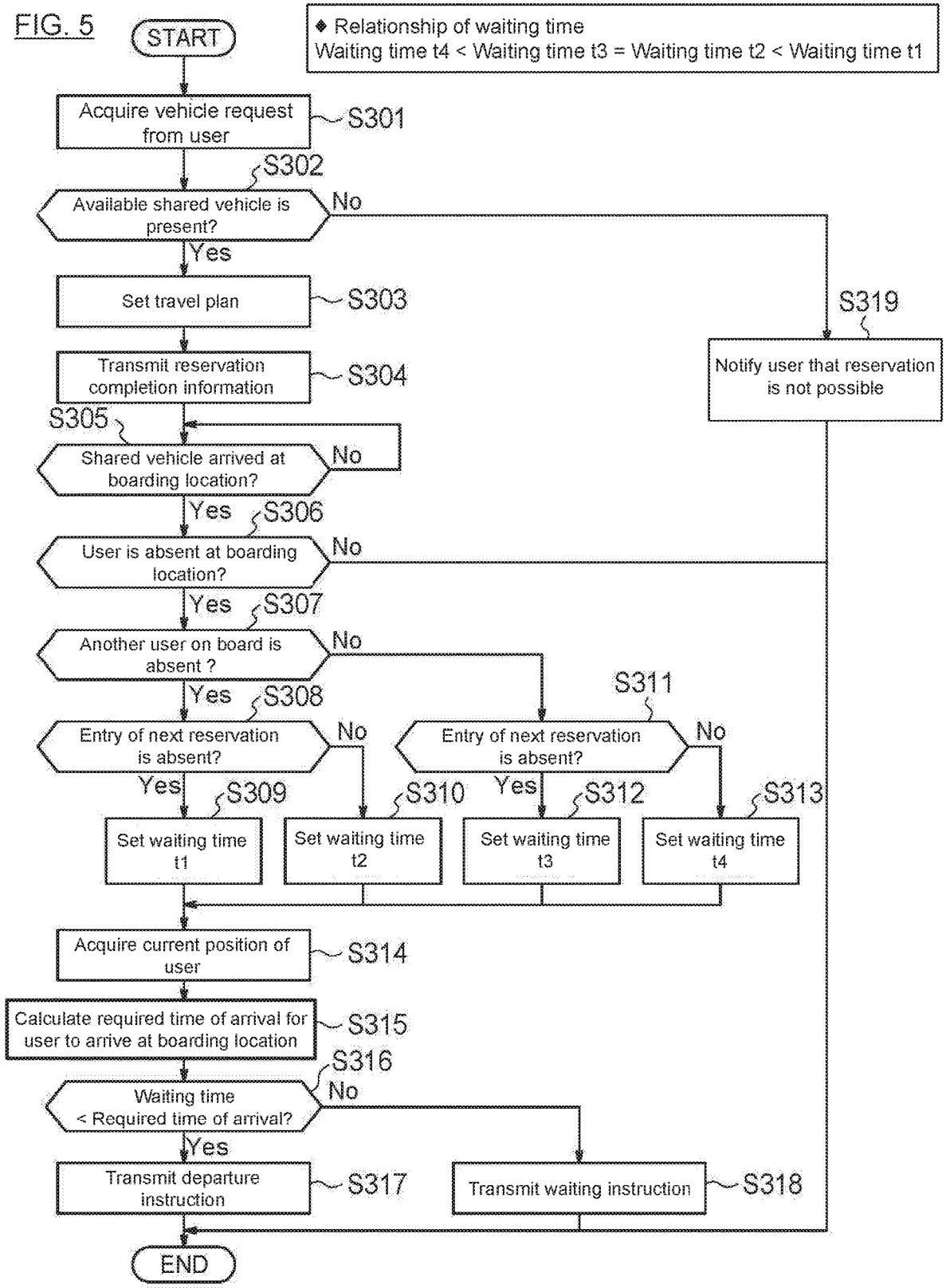
FIG. 5 is a flowchart illustrating a control flow of a shared vehicle management apparatus in a third embodiment.

The control flow of the shared vehicle management apparatus 100 in the shared vehicle management system 1 of the present embodiment will be described. FIG. 5 is a flowchart illustrating a control flow of the control device 10 of the shared vehicle management apparatus 100. The control processes of steps S301 to S313 and S319 are the same as the control processes of steps S101 to S114, so the description of each step will be borrowed herein.

When the waiting time is set in any of steps S309, S310, S312, and S313, the process proceeds to step S314.

In step S314, the control device 10 acquires information on the current position of the user absent at the boarding location. For example, the control device 10 refers to the user information 34 stored in the database 30 thereby to acquire the information on the current position of the user. Additionally or alternatively, for example, the control device 10 acquires the information on the current position of the user transmitted from the user terminal device 400A via the communication device 20.

In step S315, the control device 10 calculates a required time of arrival for the user to arrive at the boarding location. The required time of arrival refers to a time required for the user to arrive at the boarding location from the current position. The control device 10 calculates the required time of arrival on the basis of the distance from the current position of the user acquired in step S314 to the boarding location. For example, when there is a required time that is preliminarily obtained experimentally for each distance, the control device 10 calculates the distance from the current position of the user to the boarding location and calculates the required time of arrival on the basis of the required time for the preliminarily obtained distance and the calculated distance. It is assumed that the difference in the moving means used by the user is not taken into account for the required time which is experimentally obtained.

In step S316, the control device 10 compares the required time of arrival with the waiting time. The waiting time in this step refers to any of the waiting times $t_1$ to $t_4$ set in any of steps S309, S310, S312 and S313. When the required time of arrival calculated in step S315 is longer than the waiting time at the boarding location, the process proceeds to step S317, while when the required time of arrival is not longer than the waiting time at the boarding location, the process proceeds to step S318.

In step S317, the control device 10 transmits a departure instruction to the onboard device 200V1 equipped in the shared vehicle V1. In the present embodiment, the shared vehicle V1 has an autonomous driving function that allows for travel in an autonomous manner without a driver; therefore, when the onboard device 200V1 receives the departure instruction, the shared vehicle V1 can immediately depart without waiting for the user absent at the boarding location. In this step, the control device 10 updates the travel plan. Specifically, the control device 10 updates the travel plan by changing the schedule of making a stop at the boarding location and picking up the user to a schedule of departing without picking up the user.

When in step S316 the required time of arrival is not longer than the waiting time at the boarding location, the process proceeds to step S318. In step S318, the control device 10 transmits a waiting instruction to the onboard device 200V1 equipped in the shared vehicle V1. The waiting instruction includes information on a "waiting time" that indicates a time for the shared vehicle V1 to wait. When the onboard device 200V1 receives the waiting instruction, therefore, the shared vehicle V1 can wait for a time corresponding to the "waiting time" in order to wait for the user absent at the boarding location. In this step, the control device 10 updates the travel plan. Specifically, the control device 10 updates the travel plan by changing the schedule of making a stop at the boarding location and picking up the user to a schedule of waiting at the boarding location for a time corresponding to the calculated waiting time.

When the process of step S317 or S318 is completed, the control device 10 terminates the control flow.

As described above, in the present embodiment, information on the current position of the user is acquired, and the required time of arrival for the user to arrive at the boarding location is calculated. Then, when the required time of arrival is longer than the waiting time, the shared vehicle Vn is controlled to depart before the waiting time elapses. Through this operation, only a user who is expected to arrive at the boarding location within the waiting time can be waited; therefore, when the user is absent at the boarding location, other users can use the shared vehicle Vn and it is thus possible to reduce the number of users who lose the opportunity to use the shared vehicle Vn as much as possible.

The present embodiment has been described by exemplifying a configuration in which the required time of arrival is calculated on the basis of the distance between the current position of the user and the boarding location, but a modified example of the present embodiment will then be described in which the required time of arrival can be calculated with a higher degree of accuracy.

The control flow of the control device 10 of the shared vehicle management apparatus 100 according to the modified example will be described. The control flow according to the modified example is the same as the control flow according to the present embodiment except that the control processes of steps S314 and S315 are different. Specifically, the modified example is different from the present embodiment in the method of calculating the required time of arrival. The description of the present embodiment will be borrowed herein for the description of steps other than steps S314 and S315.

In step S314, the control device 10 acquires not only information on the current position of the user absent at the boarding location but also information on the moving speed of the user. The moving speed of the user refers to a speed at which the user moves before arriving at the boarding location, and is a speed that depends on the moving means used by the user. Examples of the moving speed of the user include a moving speed when moving by walk, a moving speed when moving by a train, a moving speed when moving by a vehicle, and a moving speed when moving by a motorcycle.

These moving speeds may be stored as predetermined speeds in the database 30 or may also be set for each user. The moving speed may be an instantaneous speed determined by each moving means or may also be an average speed when moving along a predetermined distance.

For example, when referring to the distance from the current position of the user to the boarding location to estimate that the user's moving means to the boarding location is walking, the control device 10 acquires the moving speed when moving by walk from the database 30. Additionally or alternatively, for example, when referring to the distance from the current position of the user to the boarding location to estimate that the user's moving means to the boarding location is a train and walking, the control device 10 acquires the moving speed when moving by the train and the moving speed when moving by walk from the database 30.

In step S315, the control device 10 calculates the required time of arrival for the user to arrive at the boarding location. In the modified example, first, the control device 10 calculates the distance from the current position of the user to the boarding location on the basis of the current position of the user acquired in step S314. Then, the control device 10 calculates the required time of arrival by dividing the calculated distance by the moving speed of the user acquired in step S314.

As described above, in the modified example of the present embodiment, information on the moving speed of the user is acquired, and the required time of arrival is calculated on the basis of the acquired moving speed of the user. Through this operation, the required time of arrival can be calculated with a high degree of accuracy, and the possibility of arrival at the boarding location within the waiting time can thus be estimated with a high degree of accuracy. As a result, it is possible to further reduce the number of users who lose the opportunity to use the shared vehicle Vn.

Fourth Embodiment

The vehicle management method or vehicle management apparatus according to another embodiment of the present invention will be described. In the present embodiment, an additional control process is added to the control process in the above-described first embodiment. The additional control process is executed when a time allowed for stopping at a road, a road side part, a private land part, or other similar place is set in accordance with regulations or rules. Other configurations and control processes are the same as those in the first embodiment, and the description of the first embodiment will be borrowed herein as appropriate.

Figure 6A:
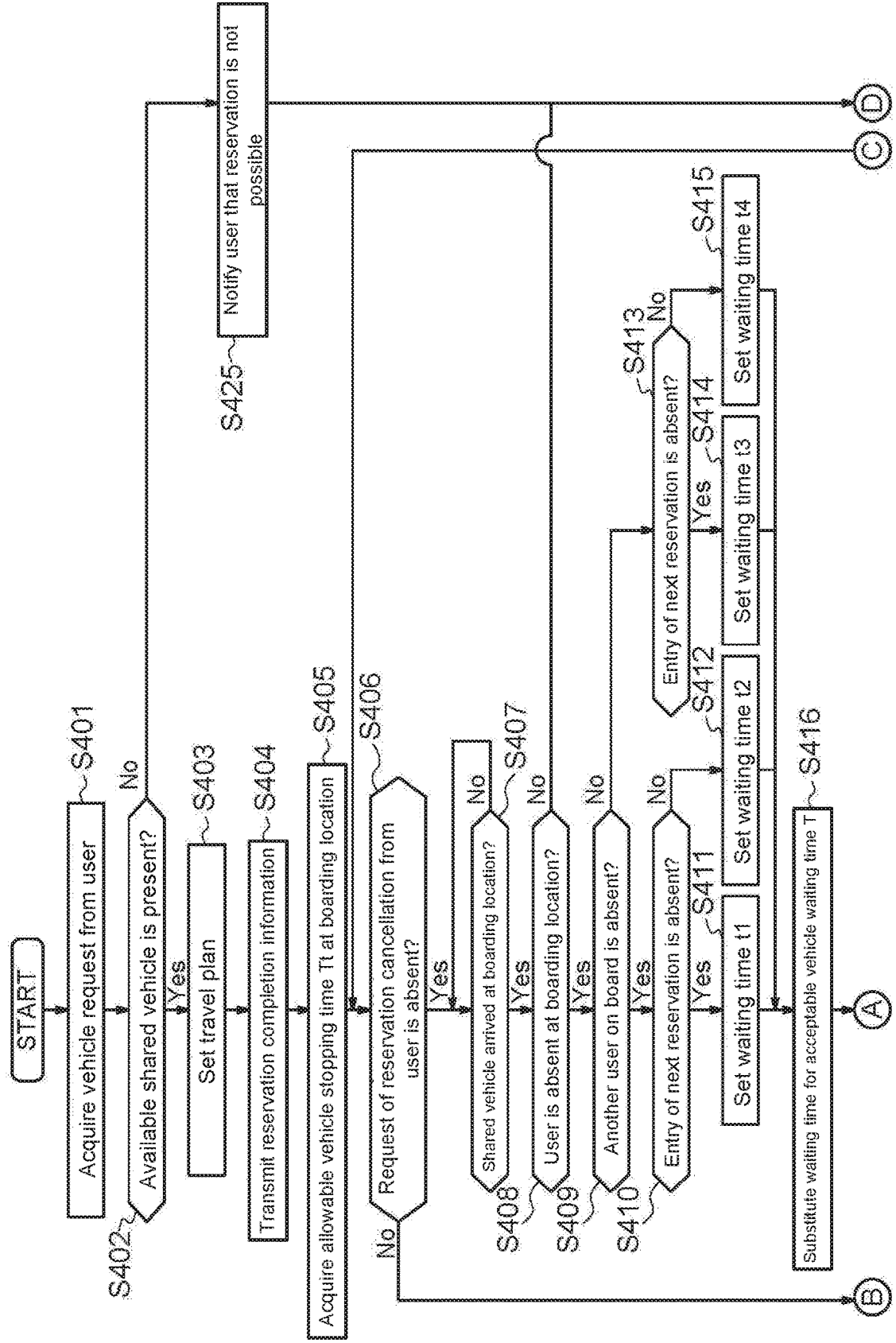
FIG. 6A is a flowchart illustrating a control flow of a shared vehicle management apparatus in a fourth embodiment.

The control flow of the shared vehicle management apparatus 100 in the shared vehicle management system 1 of the present embodiment will be described. FIGS. 6A and 6B are each a flowchart illustrating a control flow of the control device 10 of the shared vehicle management apparatus 100. The control processes of steps S401 to S404, S407 to S415, and S425 are the same as the control processes of steps S101 to S14, so the description of each step in the first embodiment will be borrowed herein for the corresponding step in the present embodiment.

In step S405, the control device 10 acquires an allowable vehicle stopping time $T_t$ at a place (e.g., a road side part) that is set by the user as the boarding location for the shared vehicle V1. The allowable vehicle stopping time $T_t$ refers to a time during which a vehicle can make a stop at a specific place, and this time is provided by law. The allowable vehicle stopping time $T_t$ is a time that differs depending on the type of a road and the type of a place at which the vehicle stops or makes a stop. For example, in the case of a road in Japan on which a car can travel, the allowable vehicle stopping time $T_t$ is "within 5 minutes". Additionally or alternatively, for example, in the case of a roadside zone of a road such as a place at which a taxi waits (so-called taxi waiting place), the allowable vehicle stopping time $T_t$ is "within 30 minutes."

In step S406, the control device 10 confirms whether or not the user requests to cancel the reservation for the use of the shared vehicle V1. For example, the control device 10 determines whether or not there is a request to cancel the reservation, in accordance with whether or not information indicating that the reservation is to be canceled is received via the user terminal device 400A. When a request to cancel the reservation cannot be confirmed, the process proceeds to step S407. On the other hand, when a request to cancel the reservation can be confirmed, the process proceeds to step S422. In step S422, the control device 10 transmits information indicating that the cancellation of the reservation has been completed to the user. Then, in step S423, the control device 10 transmits a departure instruction to the onboard device 200V1 equipped in the shared vehicle V1. This allows the shared vehicle V1, for which the reservation is canceled by the user, to start traveling toward the next destination. When the process of step S423 is completed, the control device 10 terminates the control flow.

Steps S407 to S415 correspond to steps S105 to S113 in the first embodiment, so the description of each step in the first embodiment will be borrowed herein for the corresponding step.

In step S416, the control device 10 substitutes the waiting time set in any of steps S411, S412, S414, and S415 (the time during which the shared vehicle V1 can wait at the stop position) for an acceptable vehicle waiting time T. The acceptable vehicle waiting time T is a time during which the shared vehicle V1 can wait at the boarding location, in accordance with various conditions such as whether or not another user is on board the shared vehicle V1 and whether or not a next reservation for the shared vehicle V1 is entered. After this step, the acceptable vehicle waiting time T is the waiting time set in any of steps S411, S412, S414, and S415, which the control device 10 has substituted.

In step S417, the control device 10 compares the allowable vehicle stopping time $T_t$ acquired in step S405 with the acceptable vehicle waiting time T substituted in step S416. When the acceptable vehicle waiting time T is longer than the allowable vehicle stopping time $T_t$, that is, when the set waiting time is longer than an allowable stopping time provided by regulations, the process proceeds to step S418. On the other hand, when the acceptable vehicle waiting time T is not longer than the allowable vehicle stopping time $T_t$, that is, when the set waiting time is not longer than the allowable stopping time provided by regulations, the process proceeds to step S419.

In step S418, the control device 10 sets a vehicle waiting time $T_w$ to the allowable vehicle stopping time $T_t$ acquired in step S405. The vehicle waiting time $T_w$ refers to a time during which the shared vehicle V1 waits at the boarding location. When receiving a waiting instruction from the control device 10 in the process of step S424, which will be described later, the onboard device 200V1 equipped in the shared vehicle V1 executes a process of controlling the shared vehicle V1 to make a stop at the boarding location for the time set as the allowable vehicle stopping time $T_t$. In this case, the shared vehicle V1 makes a stop at the boarding location for the user for the allowable stopping time provided by regulations.

When in step S417 the acceptable vehicle waiting time T is not longer than the allowable vehicle stopping time $T_t$, the process proceeds to step S419. In step S419, the control device 10 sets the vehicle waiting time $T_w$ to the acceptable vehicle waiting time T substituted in step S416. When receiving a waiting instruction from the control device 10 in the process of step S424, which will be described later, the onboard device 200V1 equipped in the shared vehicle V1 executes a process of controlling the shared vehicle V1 to make a stop at the boarding location for the time set as the acceptable vehicle waiting time T. In this case, the shared vehicle V1 makes a stop at the boarding location for the user for the waiting time calculated in any of steps S411, S412, S414, and S415.

In step S420, the control device 10 calculates, as a vehicle stopping time $T_p$, the time elapsed from the time point when the shared vehicle V1 makes a stop at the boarding location for the user to the present time point. Specifically, the control device 10 calculates, as the vehicle stopping time $T_p$, the time elapsed from the time point when a determination is made that the shared vehicle V1 makes a stop at the boarding location for the user on the basis of the positional information of the shared vehicle V1 to the present time point.

In step S421, the control device 10 compares the vehicle waiting time $T_w$ set in step S418 or S419 with the vehicle stopping time $T_p$ calculated in step S420. In this step, the control device 10 determines whether or not the elapsed time from the time point when the shared vehicle V1 makes a stop at the boarding location to the present time point exceeds the vehicle waiting time $T_w$. When the vehicle stopping time $T_p$ is longer than the vehicle waiting time $T_w$, that is, when the waiting time for the shared vehicle V1 has already elapsed at the present time point, the process proceeds to step S422. On the other hand, when the vehicle stopping time $T_p$ is not longer than the vehicle waiting time $T_w$, that is, when the waiting time for the shared vehicle V1 has not elapsed at the present time point, the process proceeds to step S424.

In step S422, the control device 10 transmits information indicating that the cancellation of the reservation has been completed to the user. In step S423, the control device 10 transmits a departure instruction to the onboard device 200V1 equipped in the shared vehicle V1 so that the shared vehicle V1 departs toward the next destination. This allows the shared vehicle V1 to start traveling to the next destination. When the process of step S423 is completed, the control device 10 terminates the control flow.

When in step S421 the vehicle stopping time $T_p$ is not longer than the vehicle waiting time $T_w$, the process proceeds to step S424. In step S424, the control device 10 transmits a waiting instruction to the onboard device 200V1 equipped in the shared vehicle V1. This allows the shared vehicle V1 to make a stop at the boarding location for the user for the vehicle waiting time $T_w$. When the process of step S424 is completed, the process returns to step S406. Thereafter, the processes of step S406 and subsequent steps are repeated.

As described above, in the present embodiment, the allowable vehicle stopping time T is acquired. The allowable vehicle stopping time $T_t$ is a time during which the vehicle can make a stop at the boarding location. Then, the allowable vehicle stopping time $T_t$ is compared with the acceptable vehicle waiting time T. When the acceptable vehicle waiting time T is longer than the allowable vehicle stopping time $T_t$, the allowable vehicle stopping time $T_t$ is set as the vehicle waiting time $T_w$, while when the acceptable vehicle waiting time T is not longer than the allowable vehicle stopping time $T_t$, the acceptable vehicle waiting time T is set as the vehicle waiting time $T_w$. Furthermore, the time during which the shared vehicle V1 makes a stop at the boarding location until the present time point is calculated as the vehicle stopping time $T_p$, and the vehicle waiting time $T_w$ is compared with the vehicle stopping time $T_p$. When the vehicle stopping time $T_p$ is longer than the vehicle waiting time $T_w$, the departure instruction is transmitted to the shared vehicle V1 so that the shared vehicle V1 departs toward the next destination. This can prevent the shared vehicle V1 from making a stop at the boarding location beyond the allowable vehicle stopping time $T_t$. Moreover, the shared vehicle V1 can be prevented from making a stop at the boarding location beyond the acceptable vehicle waiting time T.

The configuration and control process according to a modified example of the present embodiment will then be described. Specifically, in the modified example of the present embodiment, the control device 10 executes a vehicle waiting process in accordance with the current position of the user as described in the above third embodiment in addition to the processes of the present embodiment.

Figure 7A:
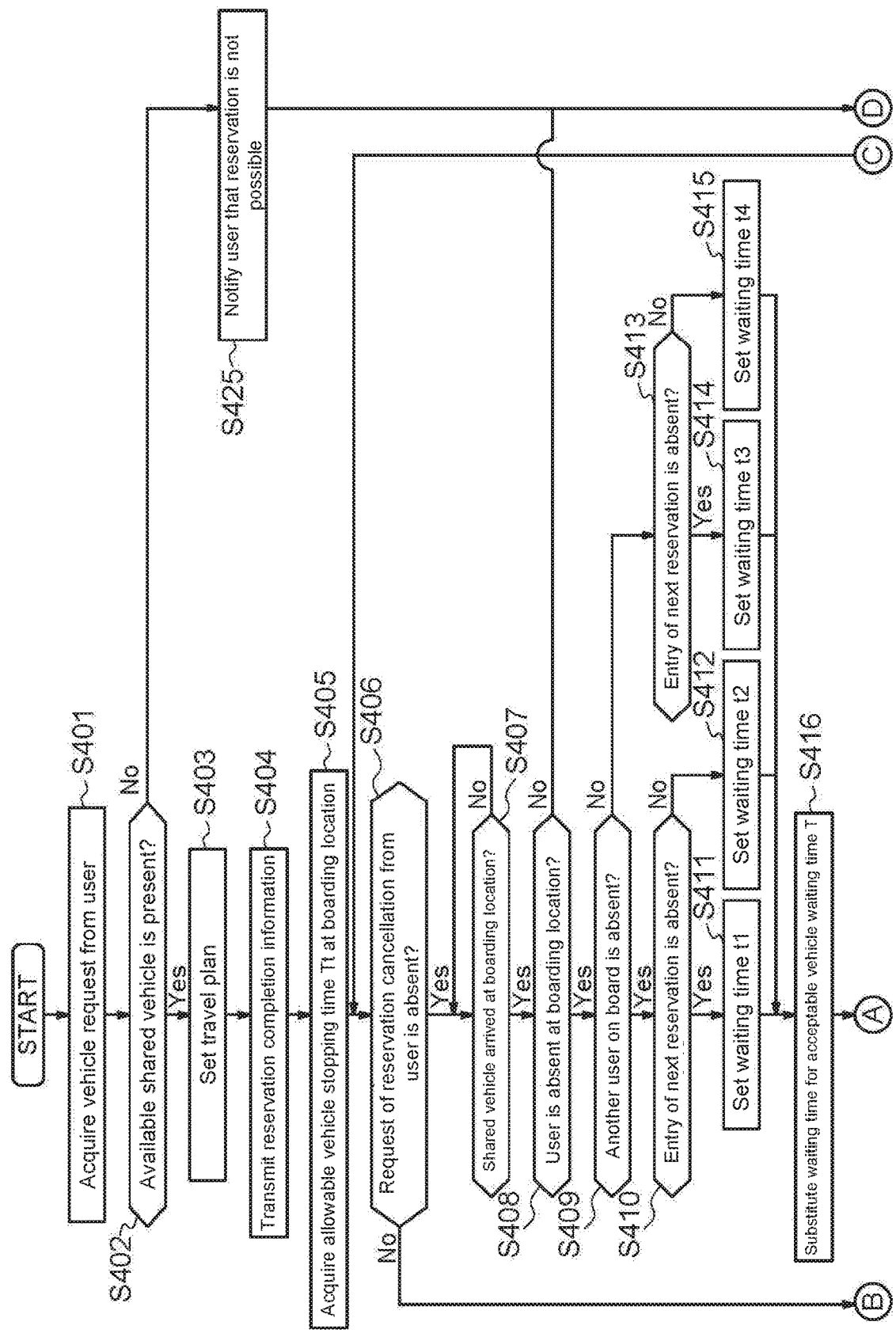
FIG. 7A is a flowchart illustrating a control flow of a shared vehicle management apparatus in a modified example of the fourth embodiment.
Figure 7B:
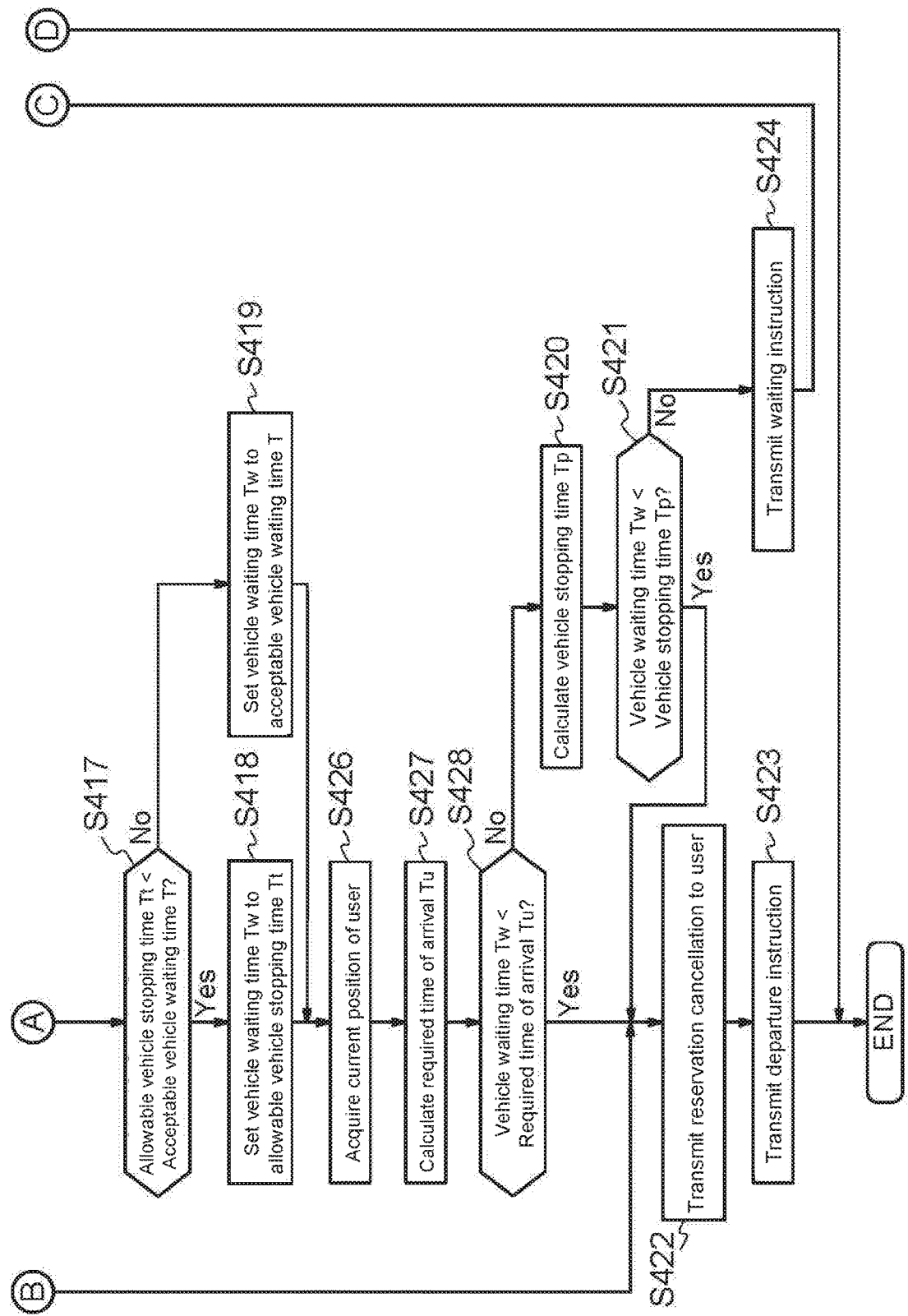
FIG. 7B is a flowchart illustrating the control flow of the shared vehicle management apparatus in the modified example of the fourth embodiment.

FIGS. 7A and 7B are each a flowchart illustrating a control flow of the control device 10 of the shared vehicle management apparatus 100 according to the modified example of the present embodiment. The control processes of steps S401 to S425 illustrated in FIGS. 7A and 7B correspond to the control processes of steps S401 to S425 illustrated in FIGS. 6A and 6B, so the description of each step in the above-described embodiment will be borrowed herein for the corresponding step.

When the control device 10 sets the vehicle waiting time $T_w$ in step S418 or S419, the process proceeds to step S426.

In step S426, the control device 10 acquires information on the current position of the user absent at the boarding location. Examples of the information on the current position include information on the latitude and longitude. This step corresponds to step S314 illustrated in FIG. 5 (see the third embodiment).

In step S427, the control device 10 calculates a required time of arrival $T_u$ for the user to arrive at the boarding location. The required time of arrival $T_u$ refers to a time required for the user to arrive at the boarding location from the current position. The control device 10 calculates the required time of arrival $T_u$ for the user on the basis of the information on the current position of the user acquired in step S426 and the positional information of the boarding location. This step corresponds to step S315 illustrated in FIG. 5 (see the third embodiment).

The method of calculating the required time of arrival $T_u$ will be described by exemplifying a case in which the positional information is represented by the latitude and longitude. For example, it is assumed that the current position of the user is represented by a latitude ($l_{at\_U}$) and a longitude ($l_{on\_U}$) while the boarding location for the user is represented by a latitude ($l_{at\_R}$) and a longitude ($l_{on\_R}$). When the distance from the current position of the user to the boarding location can be approximated by a linear distance, the control device 10 calculates a distance L from the current position of the user to the boarding location using the following equation (1).

[Equation 1]

$$L=\sqrt{\{(l_{at\_U}-l_{at\_R})^2+(l_{on\_U}-l_{on\_R})^2\}} \quad (1)$$

Then, when the distance L is calculated using the above equation (1), the control device 10 calculates the required time of arrival $T_u$ by dividing the calculated distance L by the moving speed of the user. For example, when the distance L is 200 m and the moving speed of the user is 4 km/h, the control device 10 calculates the required time of arrival $T_u$ as 3 minutes (distance L/moving speed≈0.2/4Δ60).

The above method of calculating the required time of arrival is merely an example, and the distance from the current position of the user to the boarding location may not be a linear distance. For example, when there is a difference of a predetermined distance or more between the approximated linear distance and the distance along an actual route, that is, when the error is relatively large in the approximation of the linear distance, the control device 10 may use the distance along an actual road shape as the distance from the current position of the user to the boarding location. Furthermore, the moving speed of the user may not necessarily be a speed close to the actual moving speed of the user. For example, the moving speed may be provided with a margin to intentionally create a reduced moving speed. When the moving speed provided with a margin is used, the control device 10 can calculate the required time of arrival $T_u$ so that the user can arrive at the boarding location with some margin.

Additionally or alternatively, for example, the control device 10 may adjust the required time of arrival $T_u$ for each user by multiplying the calculated required time of arrival $T_u$ by a coefficient corresponding to the properties of an individual user. Examples of the properties of an individual user include the user's gender, age, athletic performance (such as a walking speed), and physical condition of the day.

In step S428, the control device 10 compares the vehicle waiting time $T_w$ set in step S418 or S419 with the required time of arrival $T_u$ calculated in step S427. When the required time of arrival $T_u$ is longer than the vehicle waiting time $T_w$, that is, when the time required for the user to arrive at the boarding location is longer than the waiting time at the boarding location of the shared vehicle V1, the process proceeds to step S422. On the other hand, when the required time of arrival $T_u$ is not longer than the vehicle waiting time $T_w$, that is, when the time required for the user to arrive at the boarding location is not longer than the waiting time at the boarding location of the shared vehicle V1, the process proceeds to step S420.

Steps S420 to S425 correspond to steps S420 to S425 of the above-described fourth embodiment, so the description of each step in the fourth embodiment will be borrowed herein for the corresponding step.

Fifth Embodiment

The vehicle management method or vehicle management apparatus according to another embodiment of the present invention will be described. In the present embodiment, for the control process in the above-described fourth embodiment, a time allowed for stopping at a road, a road side part, a private land part, or other similar place is set in accordance with regulations or rules. In the present embodiment, even if the shared vehicle V1 cannot make a stop at the boarding location due to the allowable stopping time on regulations, when the shared vehicle V1 can make a stop at a point other than the boarding location, a process of changing the waiting place for waiting for the arrival of the user is performed. Other configurations and control processes are the same as those in the fourth embodiment, and the description of the fourth embodiment will be borrowed herein.

Figure 8A:
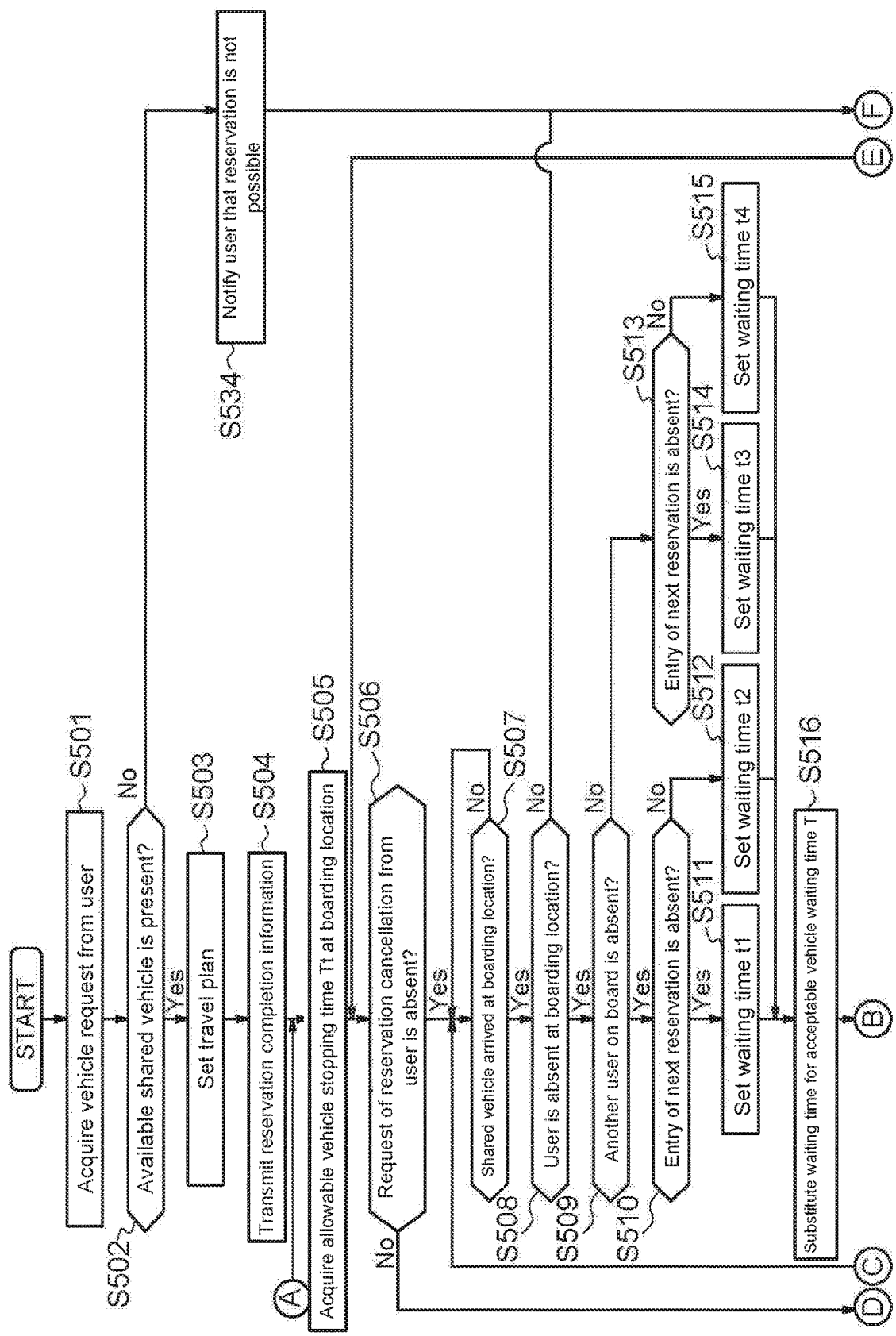
FIG. 8A is a flowchart illustrating a control flow of a shared vehicle management apparatus in a fifth embodiment.
Figure 8B:
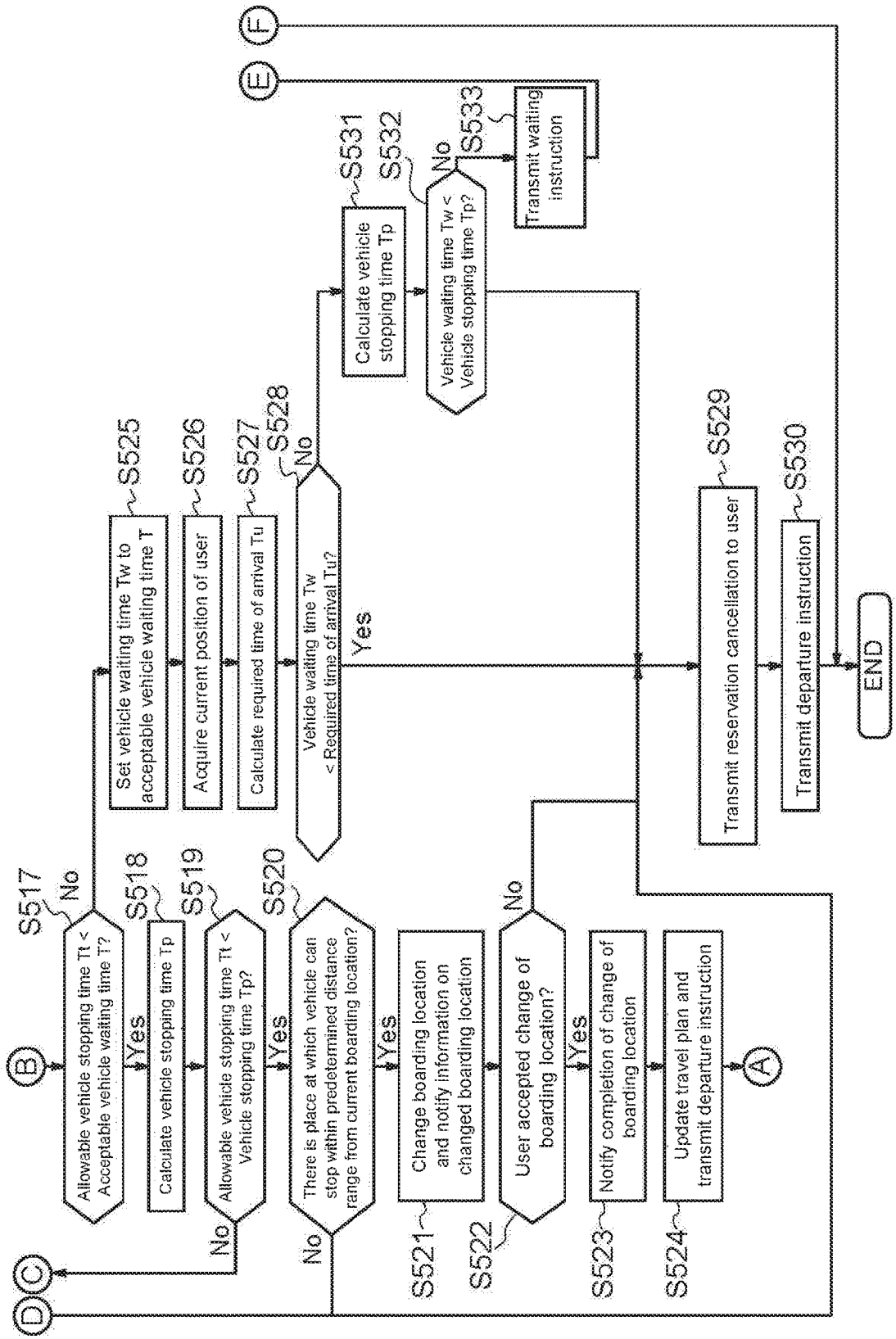
FIG. 8B is a flowchart illustrating the control flow of the shared vehicle management apparatus in the fifth embodiment.

The control flow of the shared vehicle management apparatus 100 in the shared vehicle management system 1 of the present embodiment will be described. FIGS. 8A and 8B are each a flowchart illustrating a control flow of the control device 10 of the shared vehicle management apparatus 100. The control processes of steps S501 to S517 are the same as the control processes of steps S401 to S417, so the description of each step in the fourth embodiment will be borrowed herein for the corresponding step in the present embodiment.

In step S517, the control device 10 compares the allowable vehicle stopping time $T_t$ acquired in step S505 with the acceptable vehicle waiting time T substituted in step S516. When the acceptable vehicle waiting time T is longer than the allowable vehicle stopping time $T_1$, the process proceeds to step S518. On the other hand, when the acceptable vehicle waiting time T is not longer than the allowable vehicle stopping time $T_t$, the process proceeds to step S525.

In step S518, the control device 10 calculates the time elapsed from the time point when the shared vehicle V1 makes a stop at the boarding location for the user to the present time point as a vehicle stopping time $T_p$. This step corresponds to step S420 illustrated in FIG. 7B (see the fourth embodiment).

In step S519, the control device 10 compares the allowable vehicle stopping time $T_t$ acquired in step S505 with the vehicle stopping time $T_p$ calculated in step S518. When the vehicle stopping time $T_p$ is longer than the allowable vehicle stopping time $T_t$, that is, when the shared vehicle V1 is required to depart from the boarding location, the process proceeds to step S520. On the other hand, when the vehicle stopping time $T_p$ is not longer than the allowable vehicle stopping time $T_1$, that is, when the shared vehicle V1 can remain stopped at the boarding location, the process returns to step S507.

In step S520, the control device 10 determines whether or not there is a place at which the shared vehicle V1 can make a stop within a predetermined distance range from the current boarding location. When there is a place at which the shared vehicle V1 can make a stop, the process proceeds to step S521, while when there is not a place at which the shared vehicle V1 can make a stop, the process proceeds to step S529. The predetermined distance is a distance that is experimentally obtained, and the control device 10 can change the predetermined distance as appropriate. The method of determining whether or not there is a place at which the vehicle can make a stop is not particularly limited, and the control device 10 can appropriately use a technique known at the time of filing the present application.

In step S521, the control device 10 changes the boarding location for the user from the boarding location set by the user to a place for which a determination is made in step S520 that the shared vehicle V1 can make a stop. Then, the control device 10 notifies the user of information regarding the changed boarding location. The information regarding the changed boarding location includes positional information (e.g., the latitude and route) of the new boarding location for the user and information that requests the user to accept the change of the boarding location. The user who has not arrived at the boarding location is to know the change of the boarding location by the notification from the control device 10. The user to be notified of the information regarding the boarding location changed by the control device 10 is the user who is determined to be absent at the boarding location in step S508. The user in the subsequent steps also refers to the user who is determined to be absent at the boarding location in step S508.

In step S522, the control device 10 determines whether or not the user has accepted the change of the boarding location. For example, it is assumed that the user transmits information indicating that the user accepts the change of the boarding location to the control device 10 via the user terminal device 400A. The control device 10 refers to the received information to determine that the user has accepted the change of the boarding location. In this case, the process proceeds to step S523. On the other hand, for example, it is assumed that the user transmits information indicating that the user does not accept the change of the boarding location to the control device 10 via the user terminal device 400A. The control device 10 refers to the received information to determine that the user has not accepted the change of the boarding location. In this case, the process proceeds to step S529.

In preparation for a case in which the user does not reply to the notification to the user made in step S521, for example, a time limit for the reply from the user may be provided. For example, when the user does not reply within a predetermined time after the user is notified of the information regarding the boarding location changed in step S521, the control device 10 can assume that the user has accepted the change of the boarding location. Alternatively, when the user does not reply within a predetermined time, for example, the control device 10 may assume that the user does not accept the change of the boarding location. The predetermined time is a time that can be arbitrarily set.

In step S523, the control device 10 changes the boarding location and notifies the user that the change of the boarding location has been completed.

In step S524, the control device 10 updates the travel plan on the basis of the changed boarding location. For example, the control device 10 calculates a travel route to the changed boarding location and adds the new travel route to the travel plan. Then, the control device 10 transmits a departure instruction to the onboard device 200V1 equipped in the shared vehicle V1 so that the shared vehicle V1 travels along the updated travel plan. This allows the shared vehicle V1 to start traveling toward the new boarding location. When the process of step S524 is completed, the process returns to step S505, from which the processes of step S505 and subsequent steps are executed again.

When in step S517 the acceptable vehicle waiting time T is not longer than the allowable vehicle stopping time $T_t$, the process proceeds to step S525. In step S525, the control device 10 sets the vehicle waiting time $T_w$ to the acceptable vehicle waiting time T substituted in step S516.

In step S526, the control device 10 acquires information on the current position of the user absent at the boarding location. In step S527, the control device 10 calculates the required time of arrival $T_u$ for the user to arrive at the boarding location.

In step S528, the control device 10 compares the vehicle waiting time $T_w$ set in step S525 with the required time of arrival $T_u$ calculated in step S527. When the required time of arrival $T_u$ is longer than the vehicle waiting time $T_w$, the process proceeds to step S529. On the other hand, when the required time of arrival $T_u$ is not longer than the vehicle waiting time $T_w$, the process proceeds to step S531.

Steps S529 and S530 are steps corresponding to steps S422 and S423 in the above-described fourth embodiment, so the description of each step in the fourth embodiment will be borrowed herein for the corresponding step. Steps S531 to S534 are steps corresponding to steps S420, S421, S424, and S425 in the above-described modified example of the fourth embodiment, so the description of each step in the modified example of the fourth embodiment will be borrowed herein for the corresponding step.

As described above, in the present embodiment, the allowable vehicle stopping time $T_t$ is acquired. The allowable vehicle stopping time $T_t$ is a time during which the vehicle can make a stop at the boarding location. In addition, the time during which the shared vehicle V1 makes a stop at the boarding location until the present time point is calculated as the vehicle stopping time $T_p$. Then, when the vehicle stopping time $T_p$ is longer than the allowable vehicle stopping time $T_t$, a determination is made as to whether or not there is a place at which the shared vehicle V1 can make a stop within a predetermined range from the boarding location. When a determination is made that there is a place at which the shared vehicle V1 can make a step, and the user accepts to board at the place at which the vehicle can make a step, a departure instruction is transmitted to the shared vehicle V1 so that the shared vehicle V1 makes a stop at the place at which the shared vehicle V1 can make a stop. This can prevent the shared vehicle V1 from making a stop at the boarding location beyond the allowable vehicle stopping time $T_t$, and the user can get on the shared vehicle V1 at another allowable stopping place. As a result, even a user who cannot arrive at the boarding location as scheduled can be prevented from losing the opportunity to use the shared vehicle V1.

Sixth Embodiment

The vehicle management method or vehicle management apparatus according to another embodiment of the present invention will be described. In the present embodiment, for the control process in the above-described fifth embodiment, a process for using another shared vehicle as substitute for the shared vehicle V1 is performed when the user cannot arrive at the boarding location within the allowable vehicle stopping time provided by regulations. Other configurations and control processes are the same as those in the fifth embodiment, and the description of the fifth embodiment will be borrowed herein.

Figure 9A:
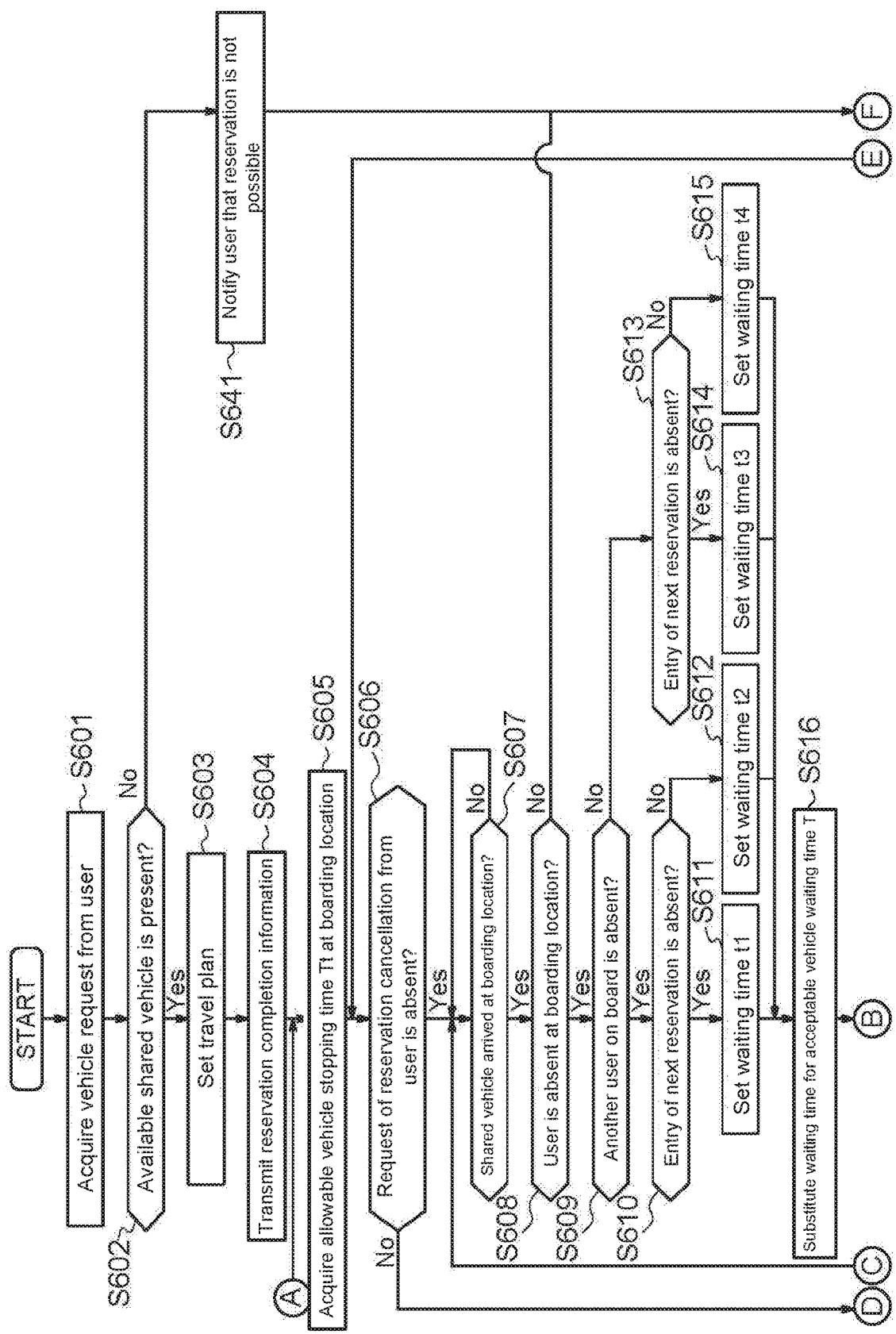
FIG. 9A is a flowchart illustrating a control flow of a shared vehicle management apparatus in a sixth embodiment.

The control flow of the shared vehicle management apparatus 100 in the shared vehicle management system 1 of the present embodiment will be described. FIGS. 9A and 9B are each a flowchart illustrating a control flow of the control device 10 of the shared vehicle management apparatus 100. The control processes of steps S601 to S627 are the same as the control processes of steps S501 to S527 in the above-described fifth embodiment, so the description of each step in the fifth embodiment will be borrowed herein for the corresponding step in the present embodiment.

In step S628, the control device 10 compares the vehicle waiting time $T_w$ set in step S625 with the required time of arrival $T_u$ calculated in step S627. When the required time of arrival $T_u$ is longer than the vehicle waiting time $T_w$, that is, when the user cannot arrive at the boarding location within the vehicle waiting time $T_w$, the process proceeds to step S629. On the other hand, when the required time of arrival $T_u$ is not longer than the vehicle waiting time $T_w$, that is, when the user can arrive at the boarding location within the vehicle waiting time $T_w$, the process proceeds to step S636.

In step S629, the control device 10 determines whether or not there is another available shared vehicle (also referred to as another in-use vehicle) within a predetermined distance range from the current boarding location. Another in-use vehicle refers to a shared vehicle different from the shared vehicle V1 which is selected on the basis of the vehicle request from the user. That is, in this step, the control device 10 reselects a shared vehicle used by the user on the basis of the vehicle request from the user. Examples of another in-use vehicle include a shared vehicle for which a small number of users reserve with respect to the number of persons who can get on the shared vehicle. Examples of the state of another in-use vehicle include a state in which other users share a ride on the vehicle and a state in which the vehicle makes a stop at a boarding location that is set by another user. When a determination is made that there is another available shared vehicle, the process proceeds to step S630, while when a determination is made that there is not another available shared vehicle, the process proceeds to step S638.

For example, first, on the basis of the current position, current usage situation, and reservation situation of each shared vehicle included in the shared vehicle information 31, the control device 10 determines whether or not there is a shared vehicle that is available and matches the vehicle request from the user. The phrase of "matching the vehicle request from the user" or other similar phrase refers to a situation in which another shared vehicle can arrive at a desired destination that is set by the user. Then, when determining that there is another shared vehicle that is available, the control device 10 determines whether or not the other shared vehicle is located within a predetermined distance range from the boarding location. When the other shared vehicle is located within a predetermined distance range from the current position of the user, the control device 10 determines that there is an available shared vehicle. On the other hand, when the other shared vehicle is not located within the predetermined distance range from the current position of the user, the control device 10 determines that there is not an available shared vehicle.

In step S630, the control device 10 calculates a travel route for the other shared vehicle determined in step S629 to travel to the boarding location. In addition, the control device 10 calculates a required time for the other shared vehicle to arrive at the boarding location along with the travel route.

In step S631, the control device 10 notifies the user of information regarding the other available shared vehicle. The information regarding the other shared vehicle includes information for requesting to accept the use of the other shared vehicle as substitute for the shared vehicle V1 and information for the user to recognize the other shared vehicle. Examples of the information for recognizing the other shared vehicle include information on the vehicle license plate, vehicle type, color of the vehicle body, etc. The information regarding the other shared vehicle includes information on the required time of arrival for the other shared vehicle to arrive at the boarding location. The user to be notified of the information regarding the other available shared vehicle is the user who is determined to be absent at the boarding location in step S608. The user in the subsequent steps also refers to the user who is determined to be absent at the boarding location in step S608.

In step S632, the control device 10 determines whether or not the user has accepted the change of the shared vehicle. For example, it is assumed that the user transmits information indicating that the user accepts the change of the shared vehicle to the control device 10 via the user terminal device 400A. The control device 10 refers to the received information to determine that the user has accepted the change of the shared vehicle. In this case, the process proceeds to step S633. On the other hand, for example, it is assumed that the user transmits information indicating that the user does not accept the change of the shared vehicle to the control device 10 via the user terminal device 400A. The control device 10 refers to the received information to determine that the user has not accepted the change of the shared vehicle. In this case, the process proceeds to step S638.

In preparation for a case in which the user does not reply to the notification made in step S631, for example, a time limit for the reply from the user may be provided. For example, when the user does not reply within a predetermined time after the user is notified of the information regarding the other available vehicle in step S631, the control device 10 can assume that the user has accepted the change of the shared vehicle. Alternatively, when the user does not reply within a predetermined time, for example, the control device 10 may assume that the user does not accept the change of the shared vehicle. The predetermined time is a time that can be arbitrarily set. The predetermined time may be the same as the time which is set in step S622 (response time for the notification of change in the boarding location) or may also be a different time.

In step S633, the control device 10 notifies the user that the process of changing the in-use vehicle for the user from the shared vehicle V1 to another shared vehicle has been completed.

In step S634, the control device 10 transmits a departure instruction to the onboard device 200V1 equipped in the shared vehicle V1 in order for the shared vehicle V1 stopped at the boarding location to depart. This allows the other shared vehicle to make a stop at the place at which the shared vehicle V1 has stopped.

In step S635, the control device 10 updates the travel plan for the other shared vehicle. For example, the control device 10 adds the travel route calculated in step S630 to the travel plan for the other shared vehicle. Then, the control device 10 transmits a departure instruction to the onboard device 200V1 equipped in the other shared vehicle in order for the other shared vehicle to depart. This allows the other shared vehicle to start traveling toward the place at which the shared vehicle V1 has stopped. When the process of step S635 is completed, the process returns to step S605, from which the processes of step S605 and subsequent steps are executed again.

Steps S636 to S641 are steps corresponding to steps S529 to S534 in the above-described fifth embodiment, so the description of each step in the fifth embodiment will be borrowed herein for the corresponding step.

As described above, in the present embodiment, information on the current position of the user is acquired, and the required time of arrival $T_u$ for the user to arrive at the boarding location is calculated. Then, when the required time of arrival $T_u$ is longer than the vehicle waiting time $T_w$, a determination is made as to whether or not there is another shared vehicle different from the shared vehicle V1 within a predetermined range from the boarding location. The other shared vehicle can be used by the user as substitute for the shared vehicle V1. When a determination is made that there is another shared vehicle and the user accepts to use the other shared vehicle, a departure instruction is transmitted to the shared vehicle V1 so that the shared vehicle V1 departs toward the next destination. This can prevent the shared vehicle V1 from making a stop at the boarding location beyond the vehicle waiting time $T_w$.

Moreover, in the present embodiment, when a determination is made that there is another available shared vehicle and the user accepts to use the other shared vehicle, a departure instruction is transmitted to the other shared vehicle so that the other shared vehicle travels toward the place at which the shared vehicle V1 has stopped. Through this operation, even when the arrival at the boarding location of the user is significantly delayed, the user can use the other shared vehicle as substitute for the shared vehicle V1. As a result, even a user absent at the boarding location when the shared vehicle V1 arrives at the boarding location can be prevented from losing the opportunity to use a shared vehicle.

It should be appreciated that the embodiments explained heretofore are described to facilitate understanding of the present invention and are not described to limit the present invention. It is therefore intended that the elements disclosed in the above embodiments include all design changes and equivalents to fall within the technical scope of the present invention.

For example, the above-described embodiments have been described by exemplifying a configuration in which the waiting time is set after the shared vehicle Vn arrives at the boarding location, but the timing of setting the waiting time is not particularly limited. For example, in a case in which, while the shared vehicle Vn is moving to the boarding location, the control device 10 refers to the distance between the current position of the user who plans to board and the boarding location to estimate that the user is absent at the boarding location when the shared vehicle Vn arrives at the boarding location, the control device 10 may preliminarily set the waiting time at the boarding location before the shared vehicle Vn arrives at the boarding location.

Moreover, for example, the above-described modified example of the third embodiment has been described by exemplifying a configuration in which, when the required time of arrival is longer than the waiting time, a departure instruction is transmitted for the shared vehicle Vn to depart from the boarding location, but the shared vehicle Vn may not be stopped at the boarding location. For example, it is assumed that, before the shared vehicle Vn arrives at the boarding location, the control device 10 estimates that the user is absent at the boarding location when the shared vehicle Vn arrives at the boarding location. In this case, the control device 10 calculates the required time of arrival for the user to arrive at the boarding location, and when the required time of arrival is longer than the waiting time at the boarding location, the control device 10 may update the travel plan so that the schedule of making a stop at the boarding location is changed to a schedule of passing through the boarding location. Then, the control device 10 may transmit a passage instruction for passing through the boarding location to the onboard device 200V equipped in the shared vehicle Vn. This allows the shared vehicle Vn to travel to the next destination without making a step at the boarding location, and the time during which the shared vehicle Vn is not used can therefore be reduced. As a result, the opportunities for using the shared vehicle Vn can be increased.

Moreover, for example, the above-described fourth to sixth embodiments have been described by exemplifying a configuration in which the allowable vehicle stopping time $T_t$ is set to a time provided by law during which a vehicle can make a stop at a specific place, but the present invention is not limited to this. For example, the allowable vehicle stopping time $T_t$ may be set to a time shorter by a predetermined time than the legally required time. Through this operation, even if the control device 10 determines that the vehicle stopping time $T_p$ is longer than the allowable vehicle stopping time $T_t$, the departure instruction can be transmitted to the shared vehicle V1 within a legally allowed time. The predetermined time is a time that is experimentally obtained and can be changed as appropriate.

Moreover, for example, the above-described fourth embodiment has been described by exemplifying a configuration in which, before the departure instruction or waiting instruction is transmitted to the shared vehicle V1, the process of comparing the allowable vehicle stopping time $T_t$ with the acceptable vehicle waiting time T (step S417) and the process of comparing the vehicle waiting time $T_w$ with the vehicle stopping time $T_p$ (step S421) are performed, but the present invention is not limited to this. For example, the control device 10 may calculate the vehicle stopping time $T_p$ (corresponding to step S420) before the processes of steps S417 to S419 and execute the process of comparing the allowable vehicle stopping time $T_t$ with the vehicle stopping time $T_p$ (corresponding to step S421). Then, when the vehicle stopping time $T_p$ is longer than the allowable vehicle stopping time $T_t$, the control device 10 may transmit the reservation cancellation to the user (corresponding to step S422) and transmit the departure instruction to the shared vehicle V1 (corresponding to step S423). This allows the departure instruction to be transmitted before the process of setting the vehicle waiting time $T_w$, and the calculation load can thus be reduced. Moreover, when the shared vehicle V1 is required to depart from the boarding location, the shared vehicle V1 can be allowed to depart earlier than in the above-described fourth embodiment.

Moreover, for example, the above-described sixth embodiment has been described by exemplifying a configuration in which a determination is made as to whether or not there is another shared vehicle as substitute for the shared vehicle V1 on the basis of the current position, usage situation, and reservation situation of the shared vehicle, but the present invention is not limited to this. For example, the control device 10 may select a shared vehicle that can arrive at the boarding location for the user within a predetermined time from among a plurality of shared vehicles on the basis of the congestion situation of roads. In this case, the control device 10 can employ, as objects to be searched for, shared vehicles that are not used by other users among the plurality of shared vehicles. Through this operation, it is possible to allocate a shared vehicle that is not being used by any user, rather than a shared vehicle that is being used or scheduled to be used by other users, and it is also possible to prevent the execution of complicated processes such as schedule adjustment for other users.

Moreover, for example, the above-described first to sixth embodiments have been described by exemplifying a configuration in which a number of users share a ride on the shared vehicle Vn in the shared vehicle management system which manages and operates car-sharing, but the present invention is not limited to this. For example, the vehicle management apparatus and vehicle management method according to the present invention can be applied also in a scene in which a specific user uses the shared vehicle Vn alone.

Moreover, for example, in the above-described embodiments, the vehicle management apparatus according to the present invention has been described as the shared vehicle management apparatus 100, but the present invention is not limited to this.

DESCRIPTION OF REFERENCE NUMERALS

1 Shared vehicle management system
  100 Shared vehicle management apparatus
    10 Control device
    20 Communication device
    30 Database
      V1 to Vn Shared vehicle
      200V1 to 200Vn Onboard device
      400A to 400Y User terminal device

The invention claimed is:

1. A shared vehicle management system, comprising:
a server including a database and managing vehicle requests from a plurality of users;
a plurality of user terminal devices each including a terminal GPS receiver for detecting a current position of the user and transmitting information on the current position of the user acquired using the terminal GPS receiver to the server via a terminal communication device;
an onboard device including a vehicle GPS receiver for detecting a current position of a vehicle and transmitting information on the current vehicle position acquired using the vehicle GPS receiver to the server via a vehicle communication device; wherein
the server is configured to:
acquire the vehicle requests from the users who request use of the vehicle from the user terminal devices;
store information on the vehicle requests in the database;
specify an available vehicle from among a plurality of vehicles as an in-use vehicle on a basis of the vehicle requests;
set a travel plan including a travel route of the in-use vehicle by way of a boarding location for each of the users;
transmit a move command to a vehicle with autonomous driving function to move along the travel route in autonomous manner, the move command including the travel route;
in a case in which a user of the users is absent at the boarding location when the in-use vehicle arrives at the boarding location, set a waiting time at the boarding location on a basis of the travel plan;
calculate a required arrival time required for the user to arrive at the boarding location from the current position of the user;
when the required arrival time is longer than the waiting time at the boarding location, transmit a departure instruction to the onboard device to allow the vehicle to automatically begin traveling upon receipt of the departure instruction; and
transmit a waiting instruction to wait for the waiting time to the onboard device to allow the vehicle to wait at a departure position upon receipt of the waiting instruction, wherein
the waiting time includes a first waiting time, a second waiting time, a third waiting time, and a fourth waiting time in decreasing order, wherein
the waiting time is set to the first waiting time based on another user is not on board and a next reservation is not entered for the shared vehicle,
the waiting time is set to the second waiting time based on the another user is not on board and the next reservation is entered for the shared vehicle,
the waiting time is set to the third waiting time based on the another user is on board and the next reservation is not entered for the shared vehicle, and
the waiting time is set to the fourth waiting time based on the another user is on board and the next reservation is entered for the shared vehicle.

2. The shared vehicle management system, according to claim 1, wherein the server is configured to:
acquire at least one of a schedule which the another user on board the in-use vehicle performs after getting off the in-use vehicle, a schedule which the user who plans to get on the in-use vehicle performs before getting on the in-use vehicle, and a schedule of use of the in-use vehicle; and
set the waiting time on a basis of the acquired schedule.

3. The shared vehicle management system, according to claim 1, wherein the server is configured to:
acquire at least one information item of traffic information, weather information, and a travel history of the vehicle; and
set the waiting time on a basis of the acquired information item.

4. The shared vehicle management system, according to claim 1, wherein the server is configured to:
update the travel plan when the required arrival time is longer than the waiting time, wherein the updated travel plan is a travel plan in which the in-use vehicle travels after the boarding location of the travel route before the waiting time elapses from a scheduled boarding time, the scheduled boarding time representing a scheduled time for the user to get on the in-use vehicle.

5. The shared vehicle management system, according to claim 4, wherein the server is configured to:
acquire information on a moving speed of the user; and
calculate the required arrival time on a basis of the moving speed of the user.

6. The shared vehicle management system, according to claim 1, wherein the server is configured to:
acquire an allowable vehicle stopping time that is a time during which the vehicle can make a stop at the boarding location;
calculate, as a stopping time, a time during which the in-use vehicle makes a stop at the boarding location until a present time point; and
when the stopping time is longer than the allowable vehicle stopping time, transmit an instruction to the in-use vehicle so that the in-use vehicle departs from the boarding location.

7. The shared vehicle management system, according to claim 6, wherein the server is configured to:
when the stopping time is longer than the waiting time, transmit the instruction to the in-use vehicle so that the in-use vehicle departs from the boarding location.

8. The shared vehicle management system, according to claim 1, wherein the server is configured to:
acquire an allowable vehicle stopping time that is a time during which the vehicle can make a stop at the boarding location;
calculate, as a stopping time, a time during which the in-use vehicle makes a stop at the boarding location until a present time point;
when the stopping time is longer than the allowable vehicle stopping time, determine whether or not there is a stop position at which the in-use vehicle can make a stop within a predetermined range from the boarding location; and
in a case in which a determination is made that there is the stop position and the user absent at the boarding location when the vehicle arrives at the boarding location accepts to board at the stop position, transmit an instruction to the in-use vehicle so that the in-use vehicle makes a stop at the stop position.

9. The shared vehicle management system, according to claim 1, wherein the server is configured to:
when the required arrival time is longer than the waiting time, specify another available vehicle different from the in-use vehicle as another in-use vehicle from among the plurality of the vehicles on the basis of the vehicle requests;
determine whether or not the another in-use vehicle is located within a predetermined range from the boarding location; and
in a case in which a determination is made that the another in-use vehicle is located within the predetermined range and the user absent at the boarding location when the in-use vehicle arrives at the boarding location accepts to use the another in-use vehicle, transmit an instruction to the in-use vehicle so that the in-use vehicle departs from the boarding location.

10. The shared vehicle management system, according to claim 9, wherein the server is configured to:
in the case in which the determination is made that the another in-use vehicle is located within the predetermined range and the user absent at the boarding location when the in-use vehicle arrives at the boarding location accepts to use the another in-use vehicle, transmit an instruction to the another in-use vehicle so that the another in-use vehicle makes a stop at the boarding location.

11. The shared vehicle management system, according to claim 1, wherein the in-use vehicle arrives at the boarding location at a scheduled boarding time that represents a scheduled time for the user to get on the in-use vehicle.

12. A vehicle management apparatus comprising a server configured to manage vehicle requests from a plurality of users, the server comprising:
a database, wherein the server is configured to:
acquire the vehicle requests from the users who request use of a vehicle from a plurality of user terminal devices, each of the vehicle requests including a current position of the user;
store information on the vehicle requests in the database;
specify an available vehicle from among a plurality of vehicles as an in-use vehicle on a basis of the vehicle requests;
set a travel plan including a travel route of the in-use vehicle by way of a boarding location for each of the users;
transmit a move command to a vehicle with autonomous driving function to move along the travel route in autonomous manner, the move command including the travel route;
in a case in which a user of the users is absent at the boarding location when the in-use vehicle arrives at the boarding location, set a waiting time at the boarding location on a basis of the travel plan;
calculate a required arrival time required for the user to arrive at the boarding location from the current position of the user;
when the required arrival time is longer than the waiting time at the boarding location, transmit a departure instruction to an onboard device of the in-use vehicle to allow the vehicle to automatically begin traveling upon receipt of the departure instruction, and
transmit a waiting instruction to wait for the waiting time to the onboard device to allow the vehicle to wait at a departure position upon receipt of the waiting instruction, wherein the waiting time includes a first waiting time, a second waiting time, a third waiting time, and a fourth waiting time in decreasing order, wherein
the waiting time is set to the first waiting time based on another user is not on board and a next reservation is not entered for the shared vehicle,
the waiting time is set to the second waiting time based on the another user is not on board and the next reservation is entered for the shared vehicle,
the waiting time is set to the third waiting time based on the another user is on board and the next reservation is not entered for the shared vehicle, and
the waiting time is set to the fourth waiting time based on the another user is on board and the next reservation is entered for the shared vehicle.

* * * * *